United States Patent [19]

Chubb et al.

[11] Patent Number: 5,582,053
[45] Date of Patent: Dec. 10, 1996

[54] COMBINED PORTABLE SHEET BENDING BRAKE AND CUTTER

[75] Inventors: Arthur B. Chubb, Romulus; Douglas J. Chubb; Norman L. Chubb, both of Carleton, all of Mich.

[73] Assignee: Tapco International Corporation, Plymouth, Mich.

[21] Appl. No.: 373,080

[22] Filed: Jan. 17, 1995

Related U.S. Application Data

[63] Continuation-in-part of Ser. No. 310,672, Sep. 22, 1994, abandoned.

[51] Int. Cl.$^6$ ..................................................... B21D 5/04
[52] U.S. Cl. ................................ 72/294; 72/319; 83/485
[58] Field of Search ..................... 72/294, 319; 83/614, 83/485, 500

[56] References Cited

U.S. PATENT DOCUMENTS

| | | |
|---|---|---|
| 516,026 | 3/1884 | Seaver . |
| 985,446 | 2/1911 | Pease . |
| 1,147,458 | 7/1915 | Steely . |
| 1,154,924 | 9/1915 | Holub . |
| 1,410,972 | 3/1922 | Wagner .................................. 83/614 |
| 1,508,869 | 9/1924 | Astrup . |
| 1,609,619 | 12/1926 | Galvin . |
| 2,109,889 | 3/1938 | Morin ..................................... 83/485 |
| 2,134,536 | 10/1938 | Schmid . |
| 3,120,915 | 2/1964 | Horn ...................................... 72/294 |
| 3,136,191 | 6/1964 | Madge . |
| 3,161,223 | 12/1964 | Marsh . |
| 3,447,409 | 6/1969 | Lewis ..................................... 83/614 |
| 3,481,174 | 12/1969 | Barnack . |
| 3,482,427 | 12/1969 | Barnack . |
| 3,559,444 | 2/1971 | Blazey . |
| 3,675,458 | 7/1972 | Veltjens ................................. 72/294 |
| 3,817,075 | 6/1974 | Marsh ................................... 72/319 |
| 3,872,755 | 3/1975 | Marsh ................................. 83/471.3 |
| 4,131,046 | 12/1978 | Strohmeyer ............................ 83/485 |
| 4,275,500 | 6/1981 | Speer ...................................... 30/40 |
| 4,321,817 | 3/1982 | Barnack ................................. 72/319 |
| 4,557,132 | 12/1985 | Break .................................... 72/319 |
| 4,574,480 | 3/1986 | Dunn ..................................... 30/240 |
| 4,646,420 | 3/1987 | Ebrahimian ............................ 72/324 |
| 4,693,004 | 9/1987 | Plana ..................................... 30/265 |
| 4,738,018 | 4/1988 | Ebrahimian ............................ 72/324 |
| 5,007,318 | 4/1991 | Cox ....................................... 83/422 |
| 5,042,349 | 8/1991 | Komatsu ................................ 83/485 |
| 5,404,739 | 4/1995 | George, II ............................. 72/294 |

FOREIGN PATENT DOCUMENTS

| | | | |
|---|---|---|---|
| 567377 | 12/1958 | Canada ................................... 83/485 |
| 667492 | 11/1938 | Germany ................................ 83/485 |
| 2223035 | 2/1973 | Germany ................................ 72/294 |
| 629304 | 12/1961 | Italy ....................................... 83/500 |
| 934951 | 8/1963 | United Kingdom .................... 83/485 |

OTHER PUBLICATIONS

Tapco Roller Cutter—Form No. 1700–102 Apr. 1988, Tapco Products Co., Inc., Detroit, MI.
Knoll–Profilierkopf—Knoll, 1993.
Dimos Coupe–Feuille Rotalame.
Nesta Couverture Outil de Coupe.

*Primary Examiner*—Daniel C. Crane
*Attorney, Agent, or Firm*—Barnes, Kisselle, Raisch, Choate, Whittemore & Hulbert, P.C.

[57] ABSTRACT

A portable sheet bending brake comprising a base and a plurality of C-shaped members positioned on the base. Each C-shaped member comprises a lower arm fixed to the base and an upper arm spaced from and overlying the lower arm. A first member is fixed to the lower arms of the C-shaped members and has a longitudinally extending clamping surface. A second member for bending a workpiece is hinged to the first member and extends longitudinally with respect to the first member. A longitudinally extending clamping member is pivoted to the upper arm of the C-shaped members. A handle member is provided on the brake for moving the clamping member. A track extends longitudinally on the portable sheet bending brake and a cutter is removably mounted on the track and is movable longitudinally of the track. The cutter comprises opposed cutting rolls adjacent the clamping surface when the cutter is on the track such that the cutter may be moved along the track to cut a workpiece.

72 Claims, 21 Drawing Sheets

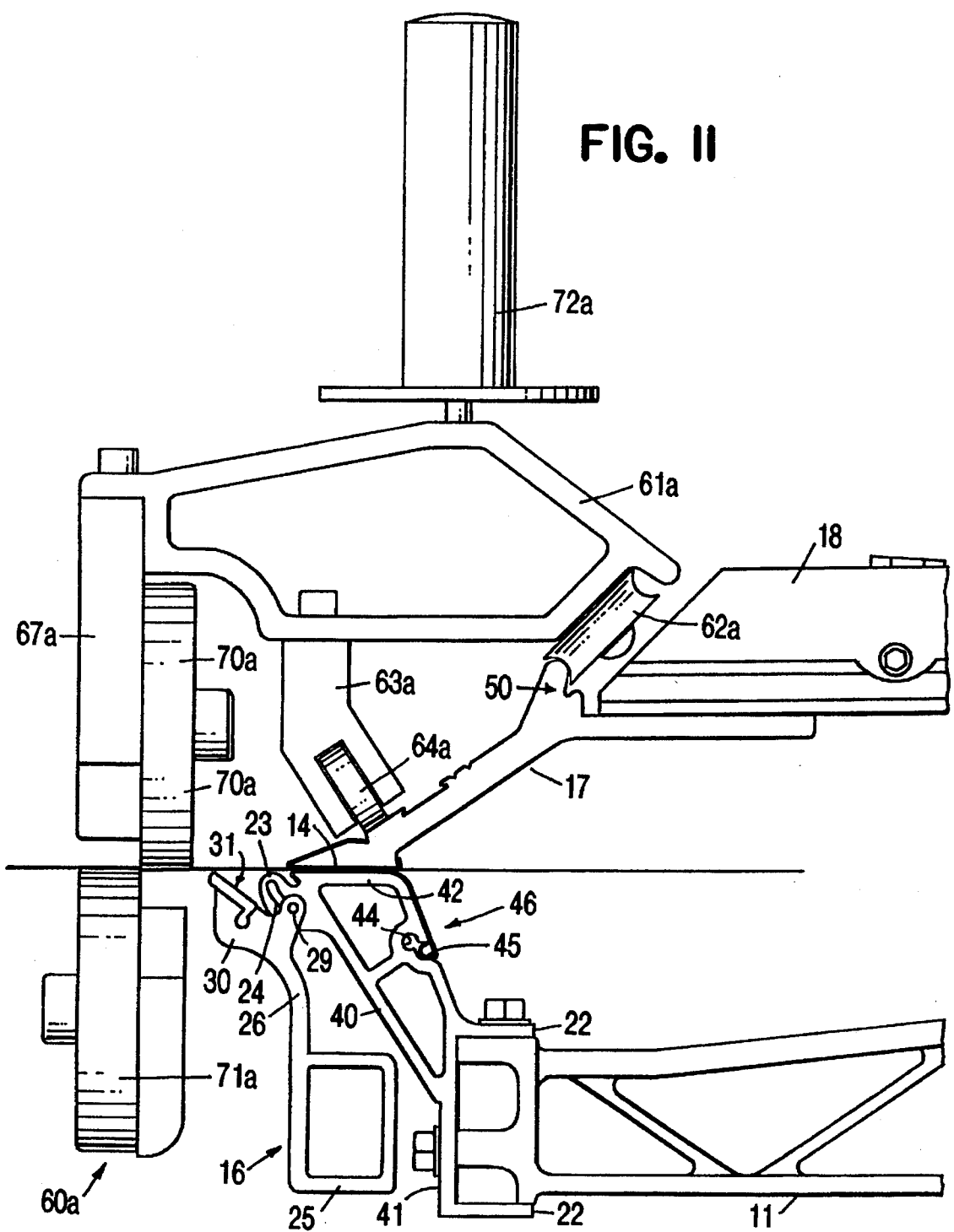

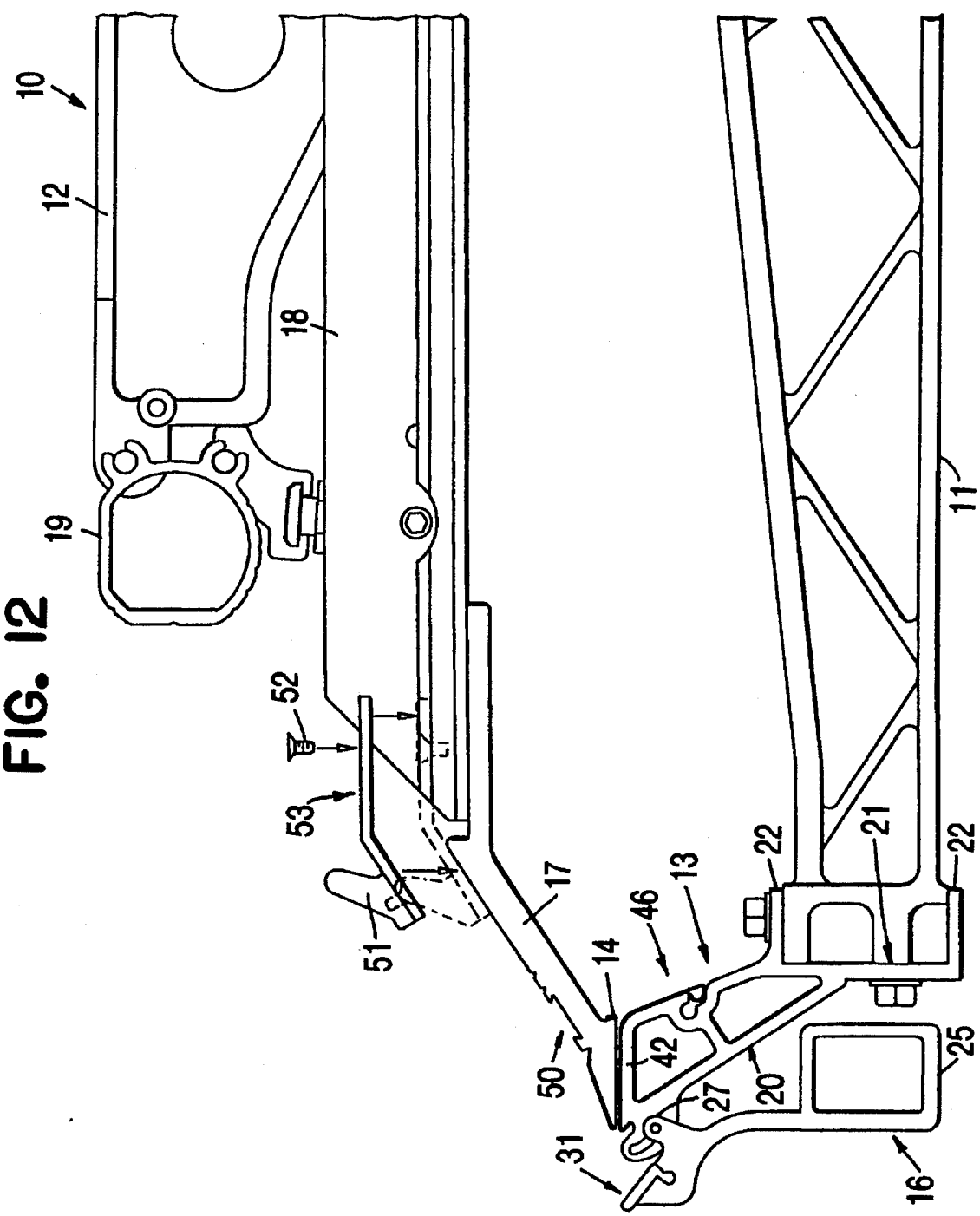

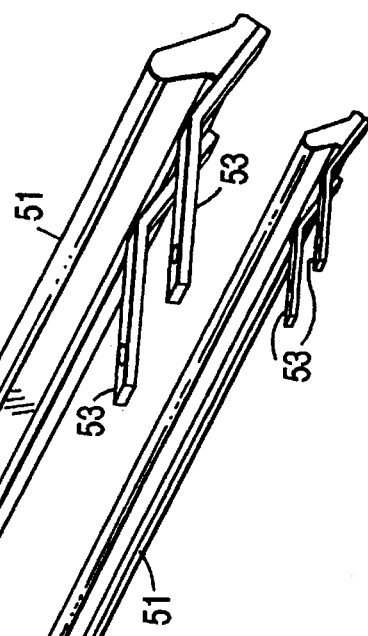
FIG. 15
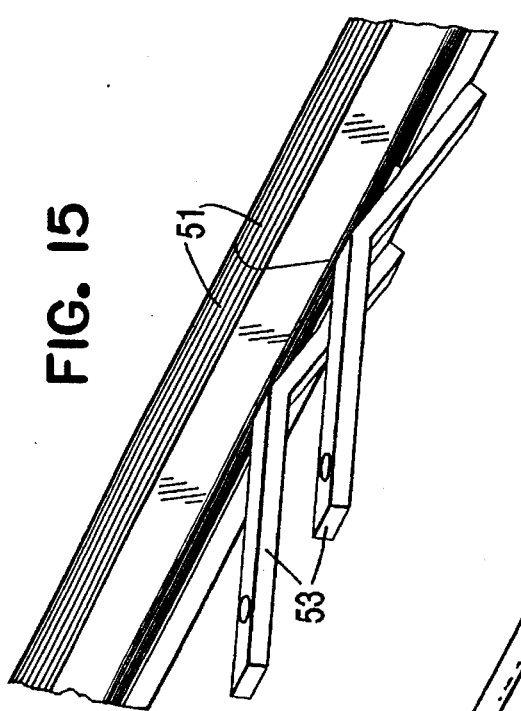
FIG. 14
FIG. 13
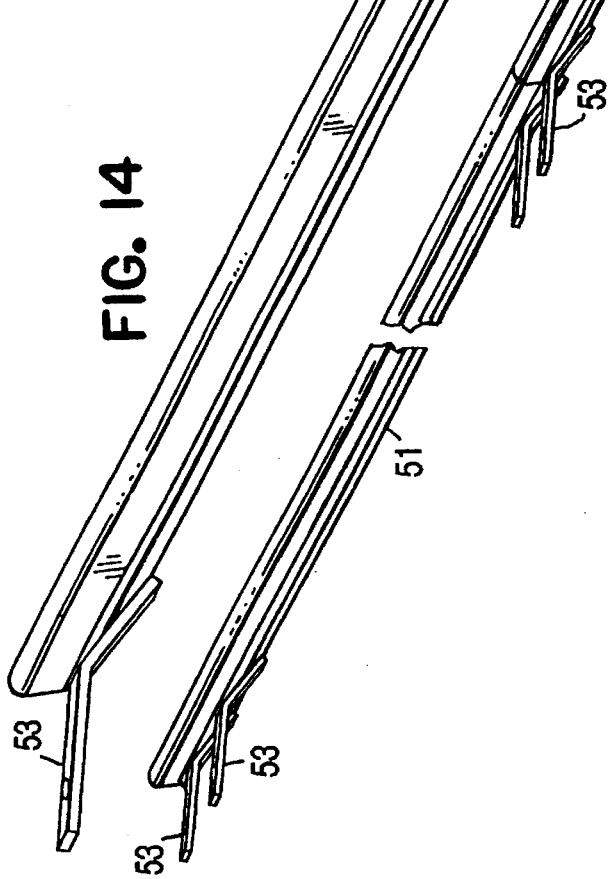

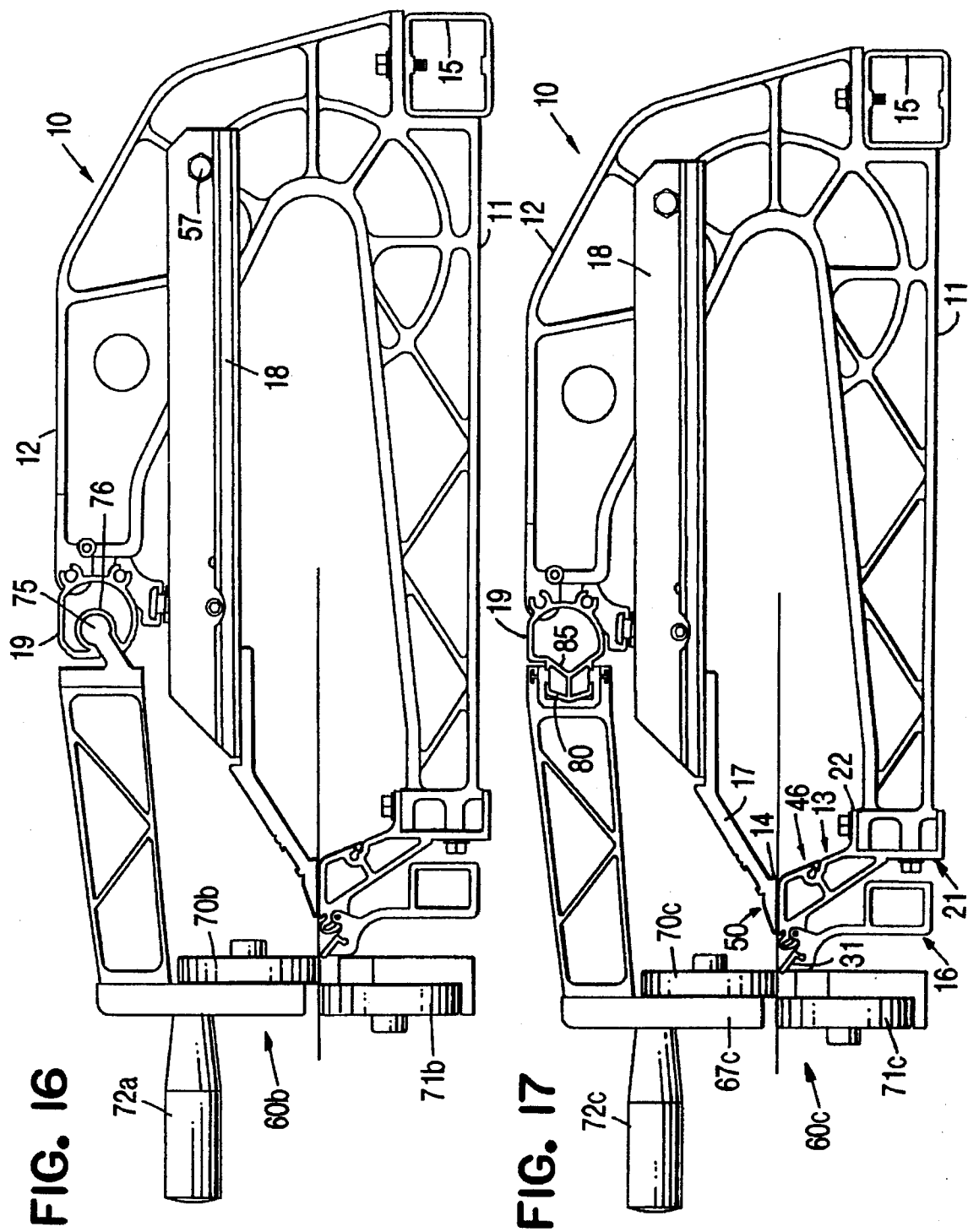

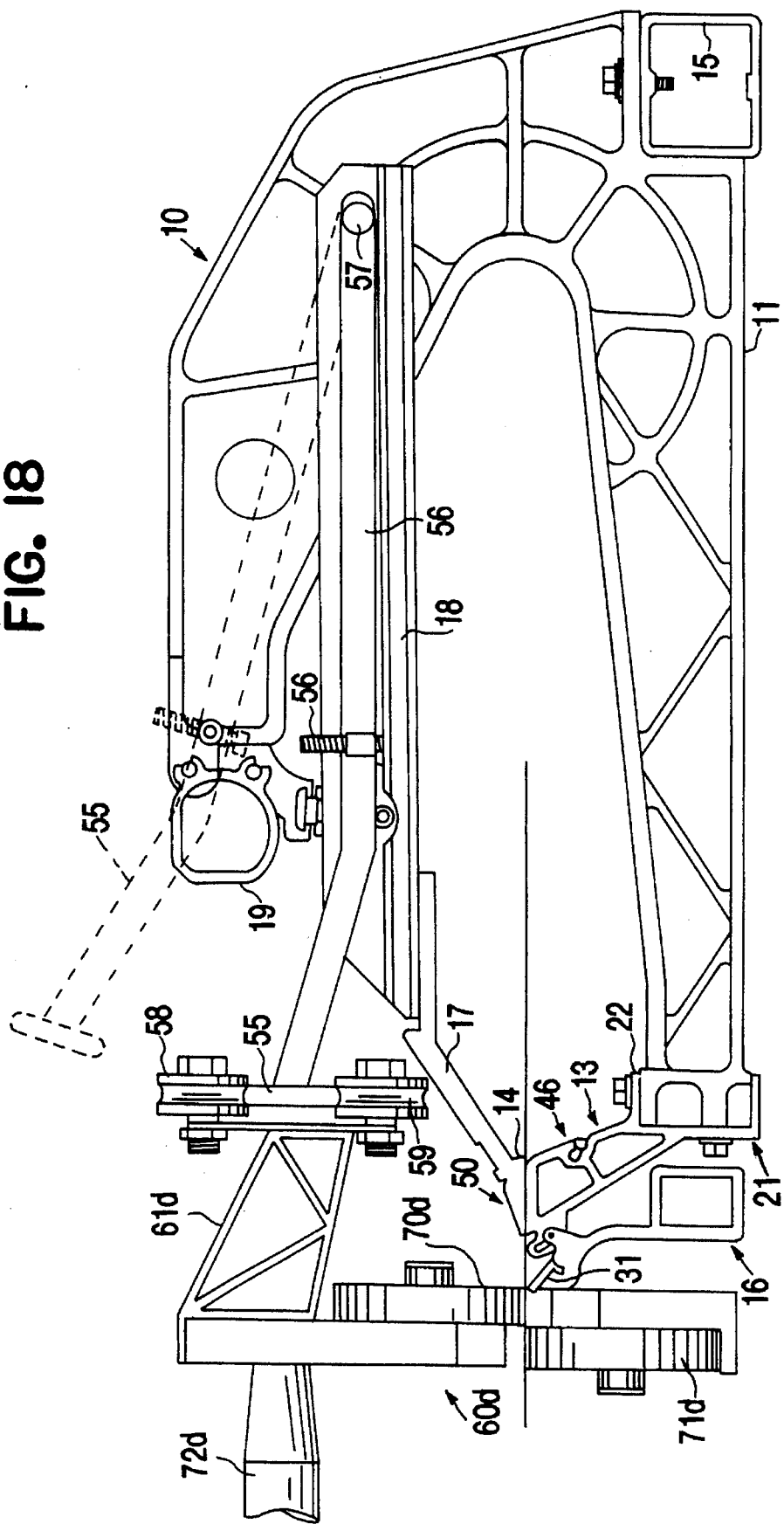

FIG. 32
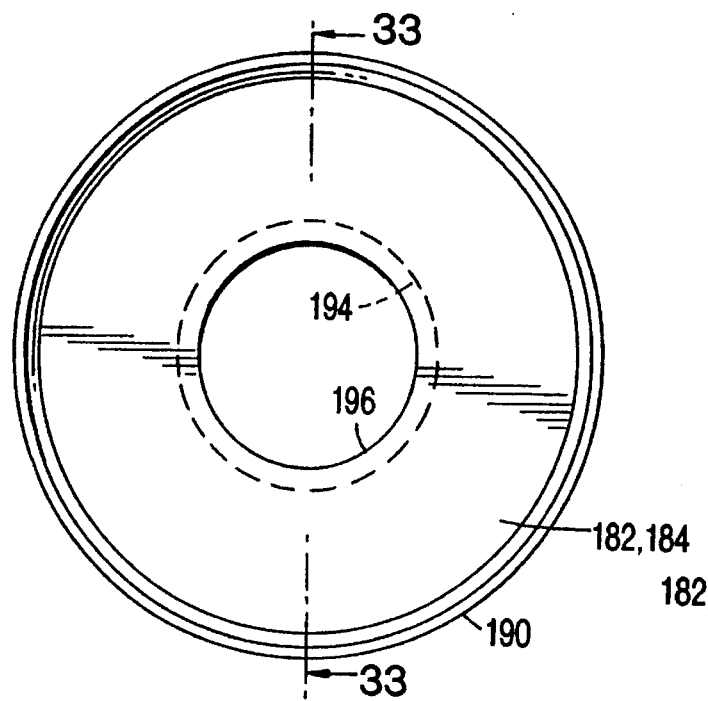
FIG. 33
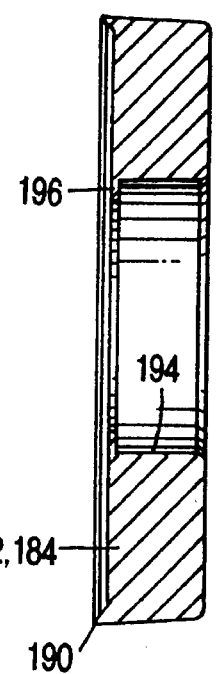
FIG. 34
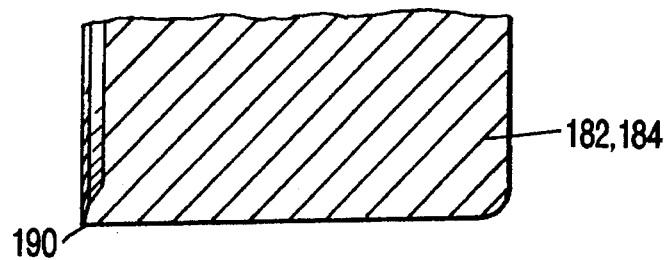
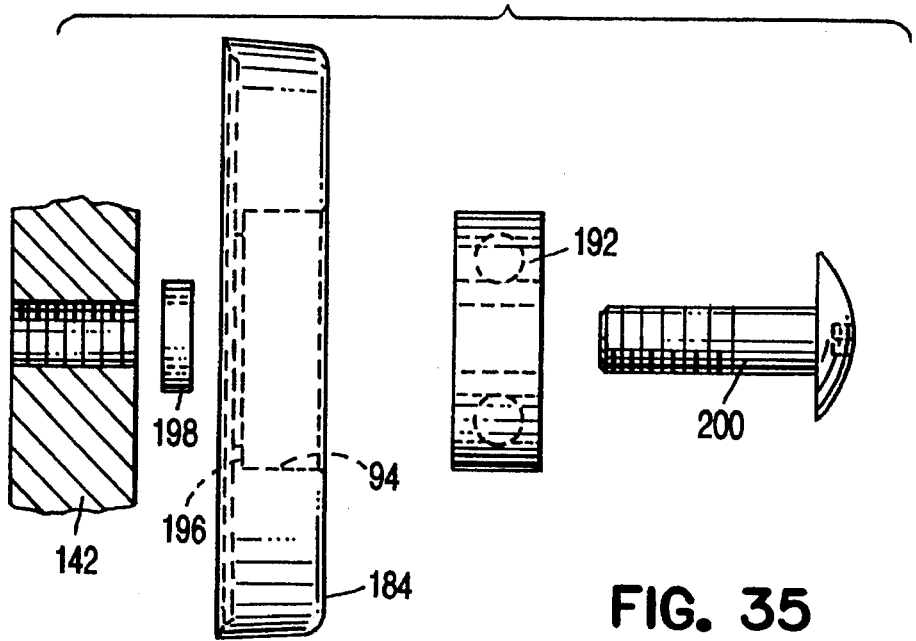
FIG. 35

COMBINED PORTABLE SHEET BENDING BRAKE AND CUTTER

This application is a continuation-in-part of U.S. application Ser. No. 08/310,672, filed Sep. 22, 1994, now abandoned.

This invention relates to sheet bending brakes.

BACKGROUND AND SUMMARY OF THE INVENTION

In recent years, various structures have been provided to form a portable sheet bending brake for bending metal or plastic sheets such as are used in siding on homes and buildings. Typical patents comprise U.S. Pat. Nos. 3,161,223, 3,481,174, 3,482,427, 3,559,444, 3,817,075, 3,872,755 and 4,321,817.

Such brakes comprise a fixed member on which the sheet is clamped and a movable bending member for bending the sheet. A major problem with respect to such sheet bending brakes is the tendency of the bending member to move relative to the portion of the sheet being bent and thereby mar the surface of the sheet.

In U.S. Pat. No. 3,161,223, the tendency to mar the surface of the sheet material was minimized by having the intermeshing integral projections between the fixed member and bending member which extend longitudinally and define the hinge that connects the bending member with the fixed member having the clamping surface, positioned so that all portions of the projections do not extend above the plane of the surface of the members when the surfaces are substantially aligned.

U.S. Pat. Nos. 3,481,174 and 3,482,427 were directed to an arrangement which included a floatable compensator on the bending member which engages the sheet material and as the bending member is swung to bend the sheet pivots so that the contact with the sheet material is maintained.

In U.S. Pat. No. 4,557,132 there is disclosed and claimed a sheet bending brake that incorporates a novel construction for minimizing the marring of the surface of the sheet material during bending; which functions without the need for added parts; which can be manufactured at low cost; and which can be adapted to sheet material of various thickness; and which can be utilized in a novel fashion to provide a complete 180° bend to the sheet material.

As described in the aforesaid patent, each of the fixed and movable bending members have substantially the entire length of the longitudinal edges thereof formed with longitudinally spaced intermeshing integral projections. The projections on the bending member having a plurality of aligned openings and the projections on the fixed member have a plurality of aligned openings comprising slots extending axially with respect to the longitudinal axis of said member. A hinge pin extends through the openings of said bending member and the slots of the fixed member. The slots have a configuration such that as the bending member is moved relative to the fixed member to bend a workpiece, the hinge pin is guided along said slots such that the contacting portion of the bending member remains substantially in the same position relative to the workpiece.

In the use of such portable sheet metal bending brakes, it is sometimes necessary to cut a workpiece while the workpiece is clamped in the sheet metal bending brakes. As far as is known, the only way now used is to use a utility knife to score the workpiece and then bend the work piece back and forth along the score line.

Such a method results in edges that are not accurate, not smooth and not flat. This manner of cutting leaves a rolled edge. In addition, it is time consuming. Furthermore, there is serious risk of marring the aluminum parts of the brake which include the clamping surface, clamping member, bending member and hinge. As a result, the repeated use of the utility knife eventually cuts the edges of the clamping member and may eventually severely damages and cut through the hinge. This reduces the useful life of the portable sheet bending brake.

Among the objectives of the present invention are to provide a portable bending brake and hand operated cutter system that is removably mounted on a portable sheet bending brake; which will accurately cut the workpiece; which requires a minimal modification of the portable sheet bending brake; which can be readily added to an existing portable sheet bending brake; which will provide accurate, smooth and flat edges on the workpiece; which cuts the workpiece quickly and is therefore time saving; which does not damage the aluminum parts of the portable sheet bending brake; and which is low in cost.

In accordance with the invention, the portable sheet bending brake includes a track mounted on either the clamping member, the bending member or the clamping handle and a removable cutter having cutting rolls thereon engaging said track and manually movable longitudinally of the track to cut a workpiece clamped in the portable sheet bending brake. In one form, the track is on the clamping member of the portable sheet bending brake and the rollers on the cutter engage the track. A second set of rollers of the cutter engage another portion of the clamping member so that the cutter is mounted in cantilever fashion on the clamping member. In another form, the track is on the C-shaped members that support the clamping members and are constructed and arranged to mount the cutter in cantilever fashion. In another form, the track on the clamping member is removably mounted on the clamping member. In a further form, the track is mounted on the bending member. In another form, the track is hinged to the bending brake.

DESCRIPTION OF THE DRAWINGS

FIG. 11 is an end elevational view of a modified form of sheet bending brake and removable cutter.

FIG. 12 is an end view of a further form of portable sheet bending brake and track.

FIG. 13 is a fragmentary perspective view of a pair of aligned tracks used in FIG. 12.

FIG. 14 is a fragmentary perspective view of a track.

FIG. 15 is a fragmentary perspective view of a portion of the joint between tracks shown in FIG. 13.

FIG. 16 is an end view of a further form of portable sheet bending brake and removable cutter.

FIG. 17 is an end view of another form of portable sheet bending brake and removable cutter.

FIG. 18 is an end view of a further form of portable sheet bending brake and removable cutter.

FIG. 32 is an elevational view of a cutting roll.

FIG. 33 is a sectional view taken along the line 33—33 in FIG. 32.

FIG. 34 is a fragmentary sectional view of an enlarged scale of a portion of the cutter roll shown in FIG. 33.

FIG. 35 is a fragmentary exploded view showing the manner in which each cutter roll is rotatably mounted.

DESCRIPTION OF THE PREFERRED EMBODIMENTS

Figure 1:
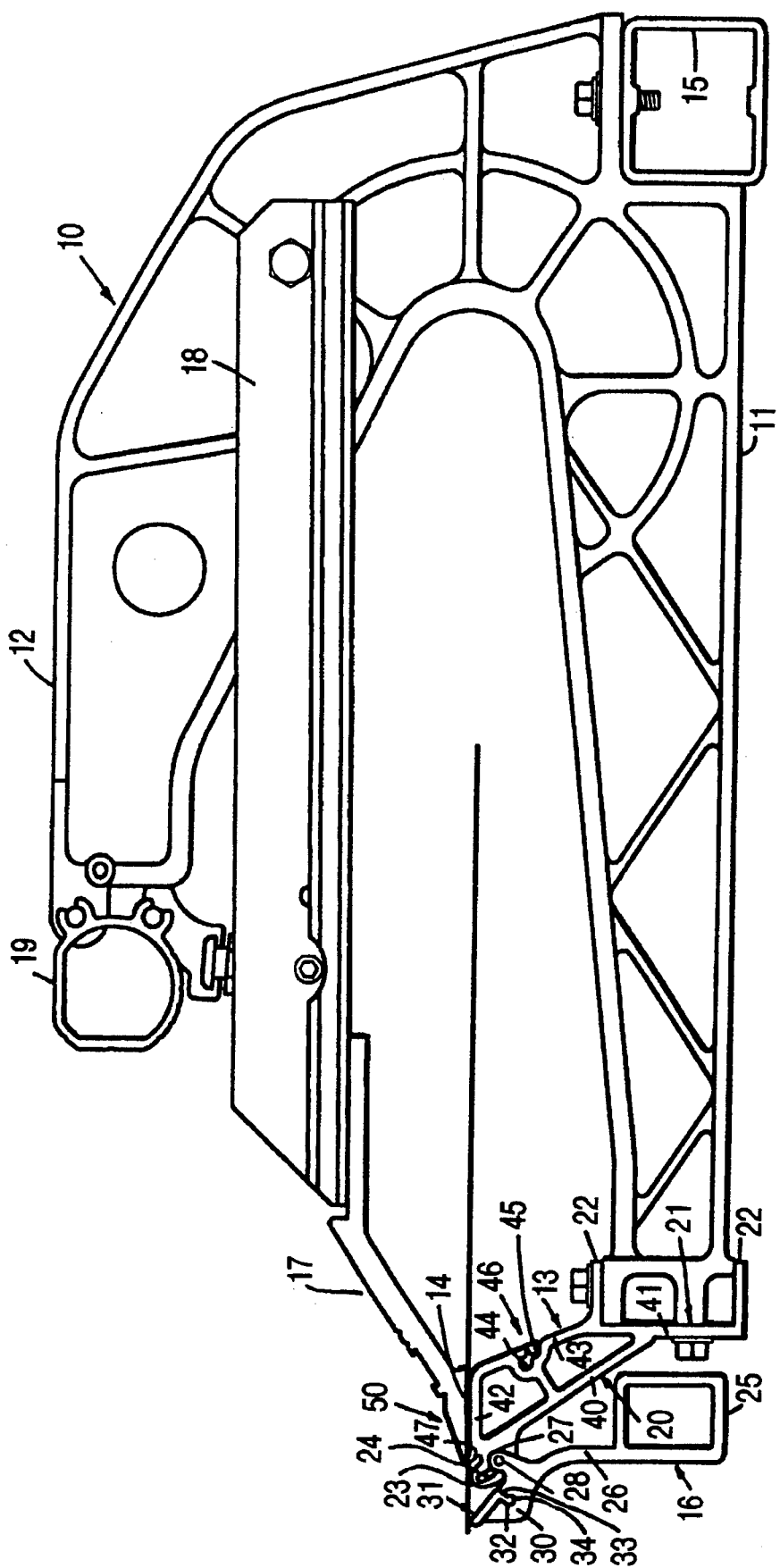
FIG. 1 is an end elevational view of a portable sheet bending brake embodying the invention.
Figure 2:
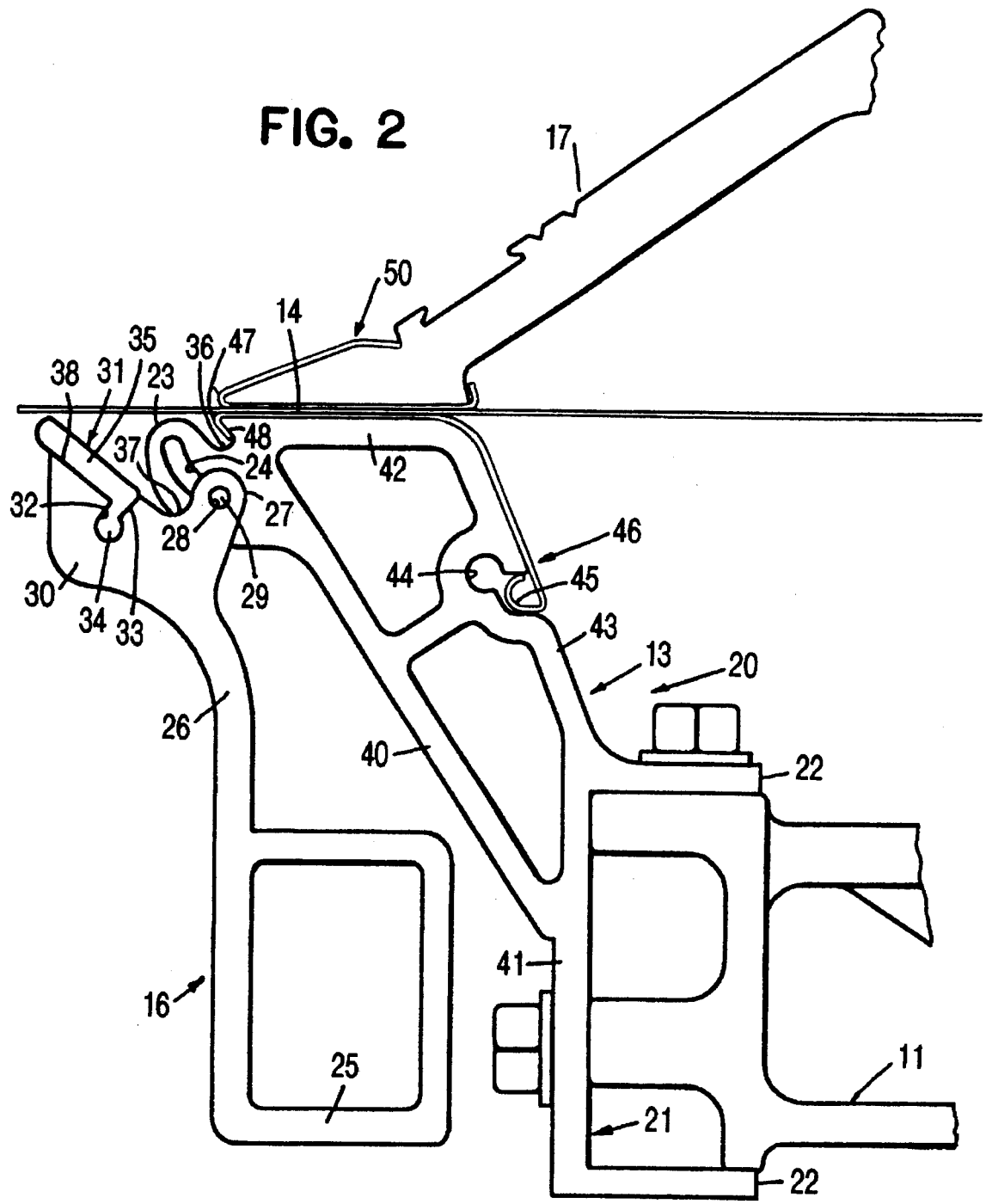
FIG. 2 is an end elevational view of a portion of the brake shown in FIG. 1 on an enlarged scale.
Figure 3:
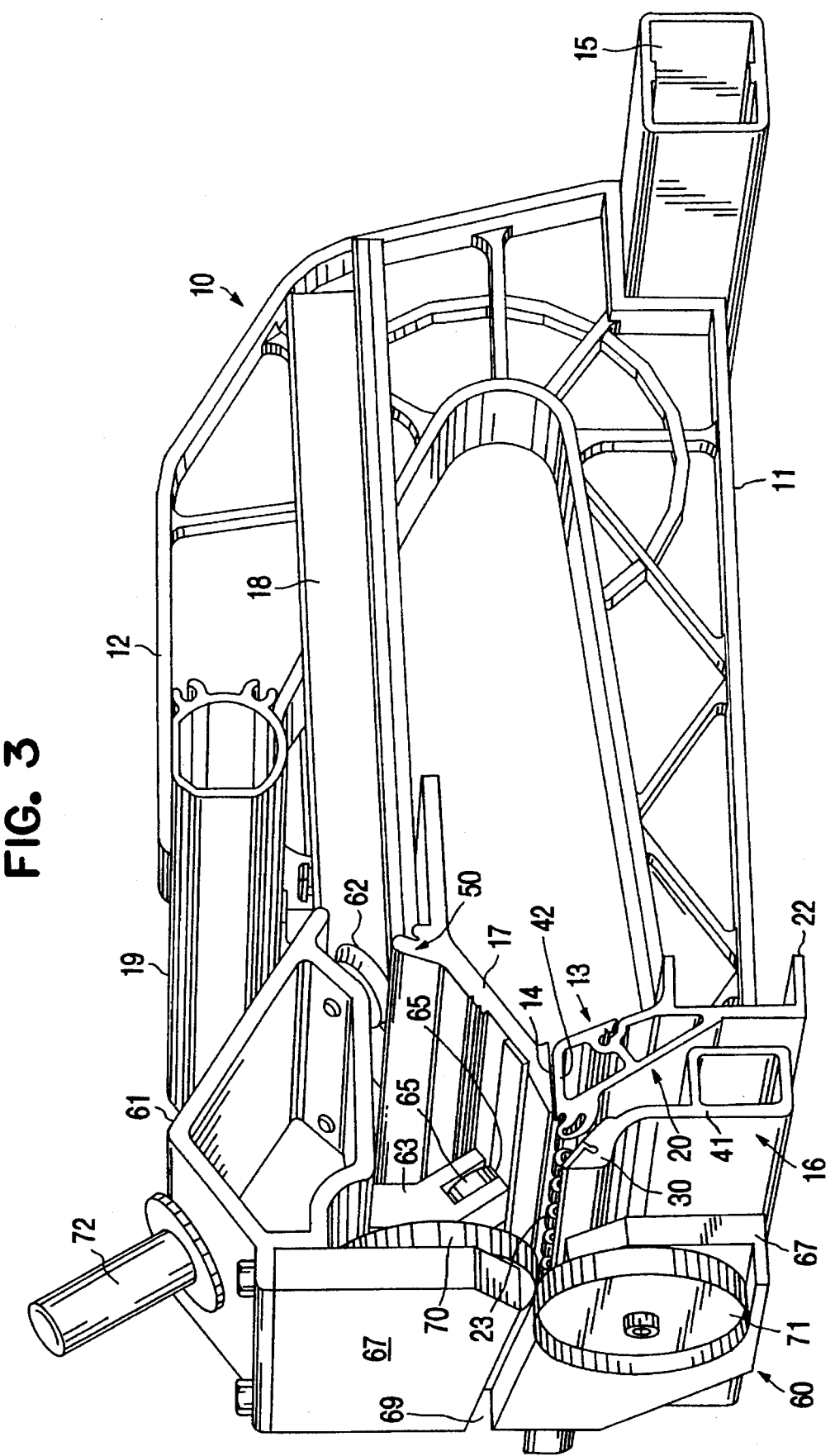
FIG. 3 is a fragmentary front perspective view of the portable sheet bending brake showing a cutter thereon.
Figure 4:
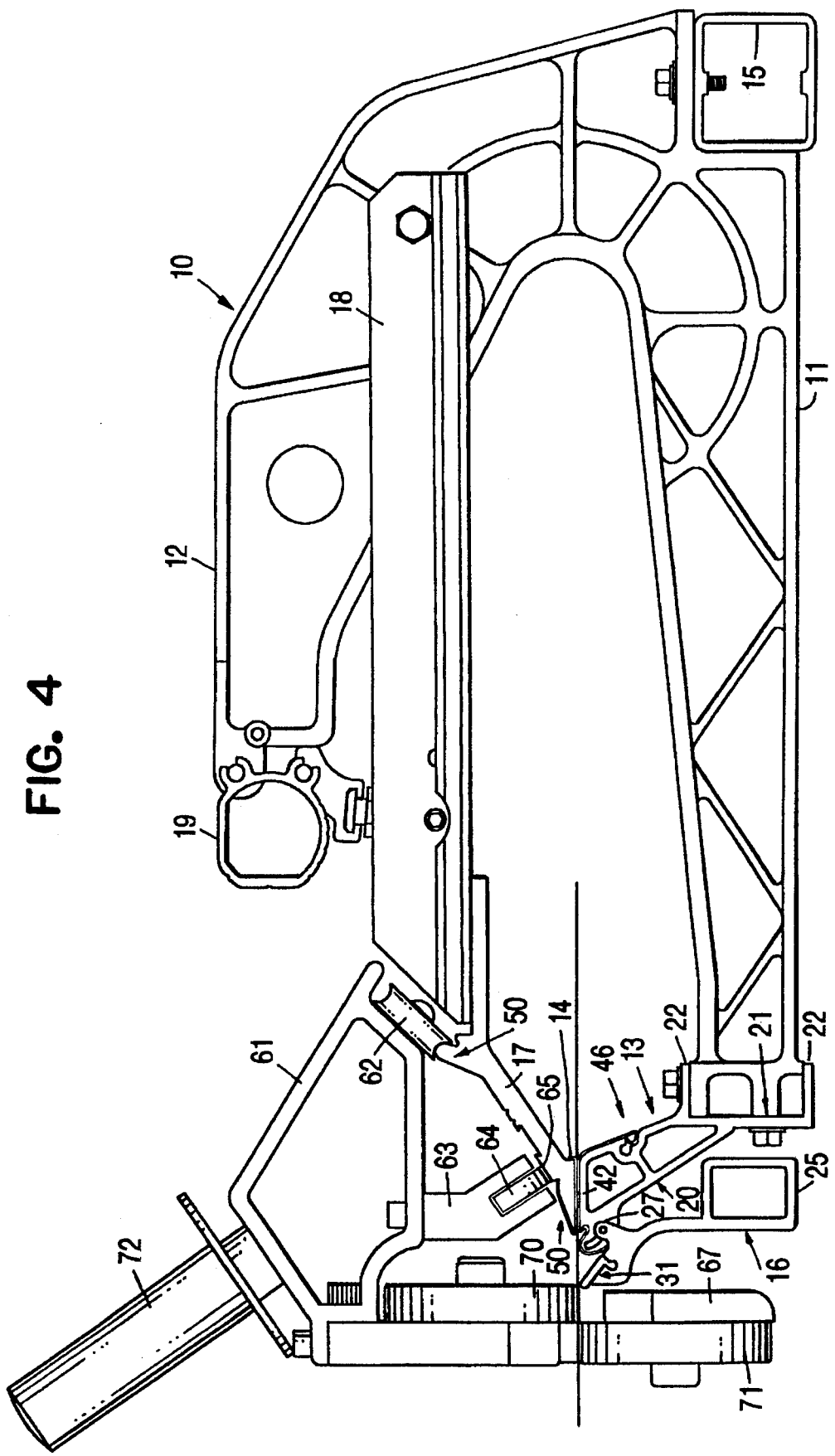
FIG. 4 is an end view of the portable sheet bending brake shown in FIG. 3.
Figure 5:
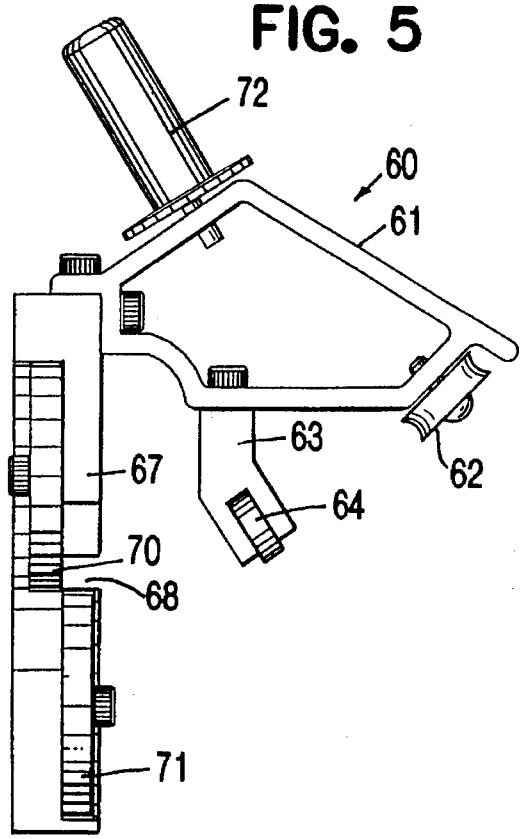
FIG. 5 is an end view of the cutter.
Figure 6:
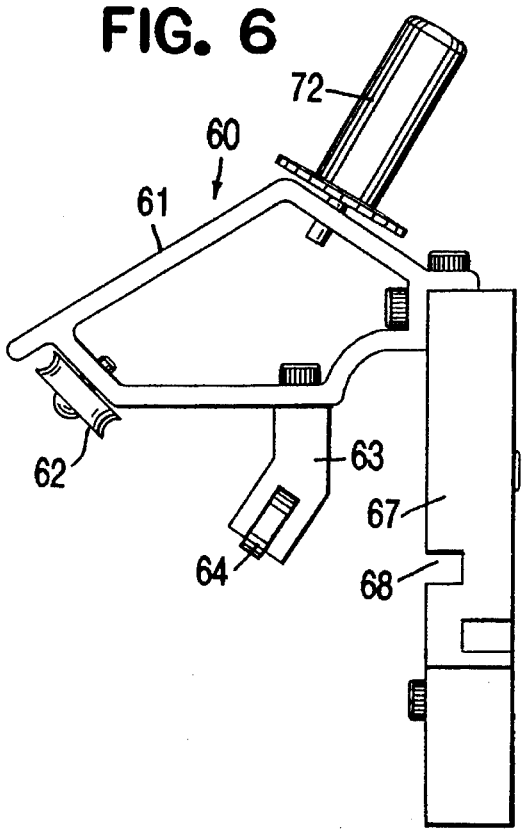
FIG. 6 is an opposite end view of the cutter.
Figure 7:
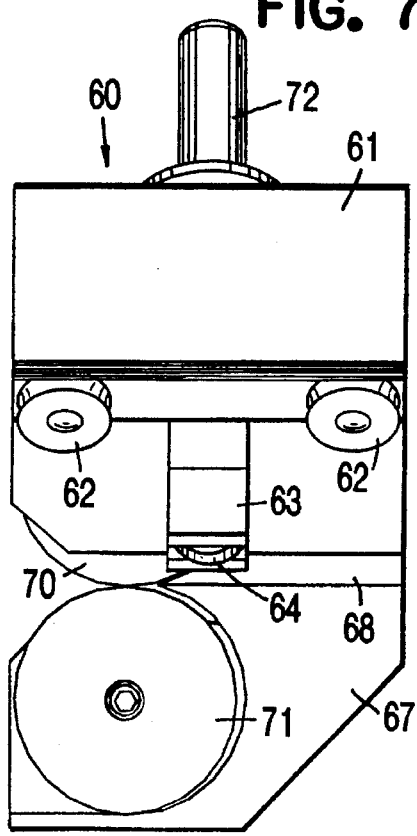
FIG. 7 is a view of the cutter taken from the right in FIG. 5.
Figure 8:
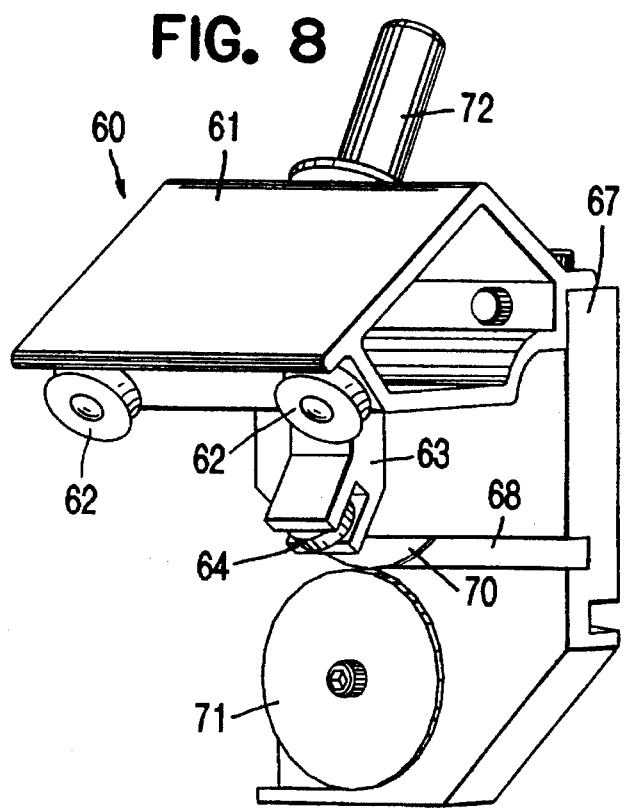
FIG. 8 is a rear perspective view of the cutter taken from the right in FIG. 5.
Figure 9:
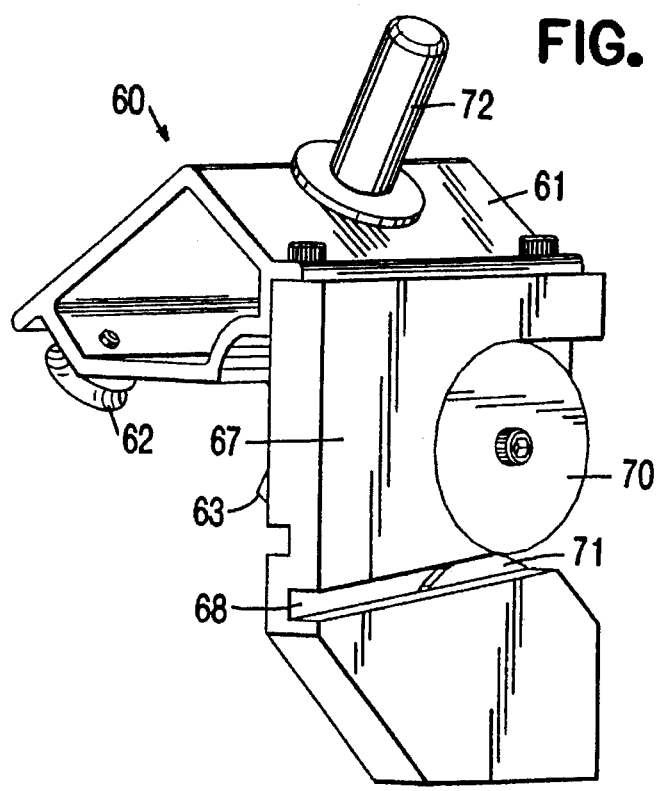
FIG. 9 is a front perspective view of the cutter taken from the left in FIG. 5.
Figure 10:
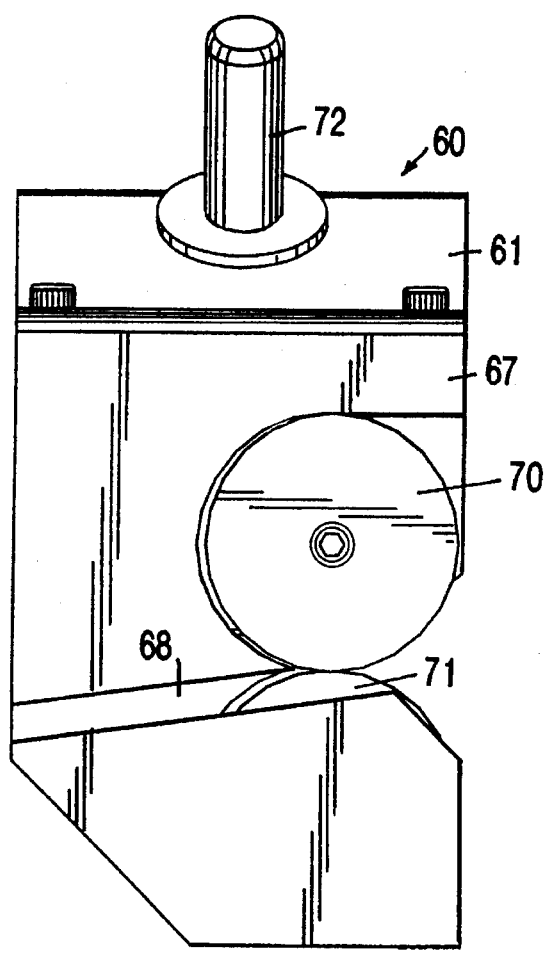
FIG. 10 is a side view taken from the left in FIG. 5.

Referring to FIGS. 1 and 2, the sheet bending brake to which the invention is applied comprises longitudinally spaced C-shaped frame members 10. Each frame member 10 includes a lower arm 11 and an upper arm 12 which overlies the lower arm 11 in spaced relation thereto. Legs may be provided as needed to support the brake above the floor or working area.

A first extruded fixed member 13 is fixed on the ends of the free lower arms 11 and defines a clamping surface 14. Longitudinally spaced base rails 15 are fixed to the rear end of the lower arms 11. A second extruded bending member 16 is hinged to the first member 13, as presently described, to provide a means for bending the sheet material.

Clamping member 17 extends longitudinally in overlying relationship to the clamping surface 14 of the first member 13. Means are provided for moving the anvil member toward and away from the clamping surface to clamp a workpiece on the clamping surface. The means for clamping the workpiece may comprise any of the structures set forth in the aforementioned U.S. patents, incorporated herein by reference, but as herein shown comprise channel shaped pivot bars 18 pivoted on each frame member 10 with the clamping member 17 fixed thereto and handle member 19 pivoted to the upper arm 12 of each C-frame member 10 and to pivot bars 18 by a plurality of extensible links 19 pivoted at the upper edge to the handle member 19 and at the lower end to the pivot bars 18. The extensible links may be of the type shown in U.S. Pat. No. 4,766,757, incorporated herein by reference, or copending U.S. patent application Ser. No. 08/111,978 filed Aug. 25, 1993, incorporated herein by reference. The first member 13 having the clamping surface 14 is formed as an aluminum extrusion and includes an upper tubular portion 20 and a lower portion 21 including spaced flanges 22 engaging the free ends of lower arms 11. A plurality of longitudinally spaced projections 23 are provided at the juncture of the portion 20 which defines the clamping surface 14. Each projection 23 has a slot 24 formed therein and the slots 24 of the various projections 23 are in longitudinal alignment. Each slot 24 has its lower ends spaced from the clamping surface A and extends outwardly and upwardly so that its upper end is generally near the plane of the clamping surface. Each slot 24 is preferably arcuate and has a center spaced from the clamping surface and preferably extends for substantially 90°.

The bending member 16 is also in the form of an aluminum extrusion including a tubular portion 25 and a longitudinally extending leg 26 with a plurality of longitudinally spaced projections 27 having openings 28 therein. The projections 27 of the bending member 16 mesh with the projections 23 of the fixed member 13 and a pin 29 extends through the openings 28 and slots 24 to hinge the bending member 16 to the fixed member 13. The bending member 16 further includes a portion 30 that extends upwardly and outwardly when the bending member 16 is in position for bending and has a contacting portion defined by a longitudinally extending plastic strip 31 positioned in a recess 32. The recess is generally L-shaped and the strip 31 includes a short leg 33 having an enlarged end portion 34 for holding the strip 31 and the other leg 35 thereof extends along the recess beyond the portion to define a sheet contacting portion. Strip is preferably made of polyurethane having a durometer of 60 on the A scale.

The fixed member 13 further includes a recess 36 extending longitudinally at the juncture of the clamping surface 14 and the projections 23. Recess 36 functions as a pocket into which any burrs may fall from a knife used for scoring the workpiece. The clamping surface 14 is spaced slightly above the projections 23 in order to minimize marring of the surface of the workpiece when it is inserted and removed. The bending member 16 also includes a recess 37 extending longitudinally between the projections 27 and the contacting portion 31.

In use, a workpiece of sheet material is clamped against the clamping surface 14 and the bending member 16 is moved by swinging the handle bringing the contacting portion of the bending member 16 in engagement with the sheet material. As the bending member is swung upwardly, the hinge pin 29 on the bending member 16 moves along the slots 24 and is guided in a fashion such that the contacting portion maintains substantially the same relative position of contact thereby minimizing marring of the surface of sheet material.

The present invention is directed to providing a removable hand operated cutter system on a portable sheet bending brake. In FIGS. 3–18, the invention will be described in connection with the above-described type of portable sheet bending brake which is substantially like U.S. Pat. Nos. 4,557,132 and 5,343,728 and pending application Ser. No. 08/254,177 filed Jun. 6, 1994, incorporated herein by reference.

In the form of the invention shown in FIGS. 3–10, the clamping member 17 is formed with an integral extruded track 50 and a hand operated cutter 60 is mounted on the track. The cutter 60 includes an extruded generally tubular body 61 that supports longitudinally spaced rollers 62 having concave peripheries that engage the track 50. The body 61 further includes a member 63 supporting a roller 64 that engage a surface 65 of the clamping member 17 thereby mounting the cutter in a cantilever fashion. The body 61 supports a roller assembly 66 that includes an integral body 67 having a transverse recess 68 on one side and an inclined recess 69 on the other. Cutting rollers 70, 71 are rotatably mounted with overlapping peripheries in accordance with conventional roller cutting action such that when the cutter 60 is moved longitudinally of the portable sheet bending brake a workpiece W is severed or slit.

A handle 72 is mounted on the body for manipulating the cutter in the longitudinal movement. The rollers 62 are preferably of the eccentrically mounted type so that the cutter can be adjusted in order to accommodate any variations in the extrusions 61 and 17.

In the form of the invention shown in FIG. 11, the extruded tubular body 61a is modified such that the handle 72 extends vertically. In all other respects, the cutter 60a is like that described above.

In the form of the invention shown in FIGS. 12–15, longitudinally extending track 51 is removably mounted on the portable sheet bending brake and specifically held in position by bolts 52 which normally connect the clamping member 17 with pivot bars 18. The bolts 52 extend through spaced mounting arms 53 on the track. As shown in FIGS. 13–15, the track 51 comes in various lengths that can be abutted one to another to form a longitudinal track, depending on the length of the portable sheet bending brake.

In the form of the invention shown in FIG. 16, the cutter 60b is mounted in cantilever fashion by a projection 75 engaging a recess 76 in the clamping handle 19. The projection has a spherical end fitting into the arcuate recess 75 and providing a track for the cutter 60b.

In the form shown in FIG. 17, the cutter 60c is provided with a recess 80 that engages a track 81 on the clamping handle 19.

In the form of the invention shown in FIG. 18, the track 55 is supported on arms 56 on each end of the portable sheet bending brake which are pivoted by pivot 57 to the endmost C-shaped member 10. The arms are movable from a position to the rear of the sheet bending brake (on the right in FIG. 18) to a position where the track 55 extends longitudinally of the brake for supporting the removable cutter 60d. The extruded body 61d is modified to support pairs of rollers 58, 59 to engage the upper and lower edges of the tracks.

Figure 19:
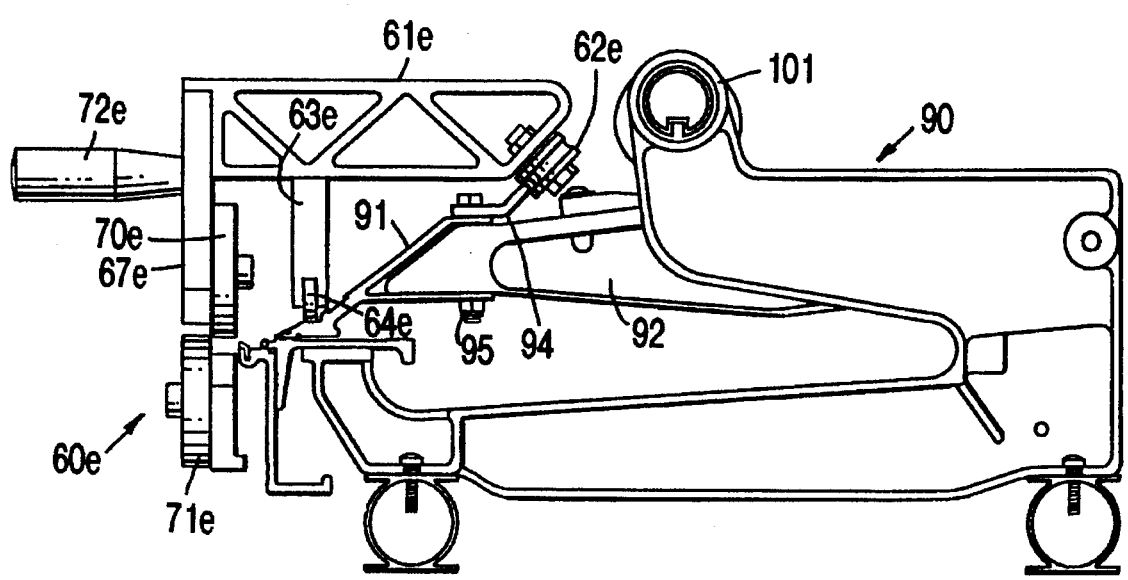
FIG. 19 is an end view of a portable sheet bending brake of another type with a removable cutter.
Figure 21:
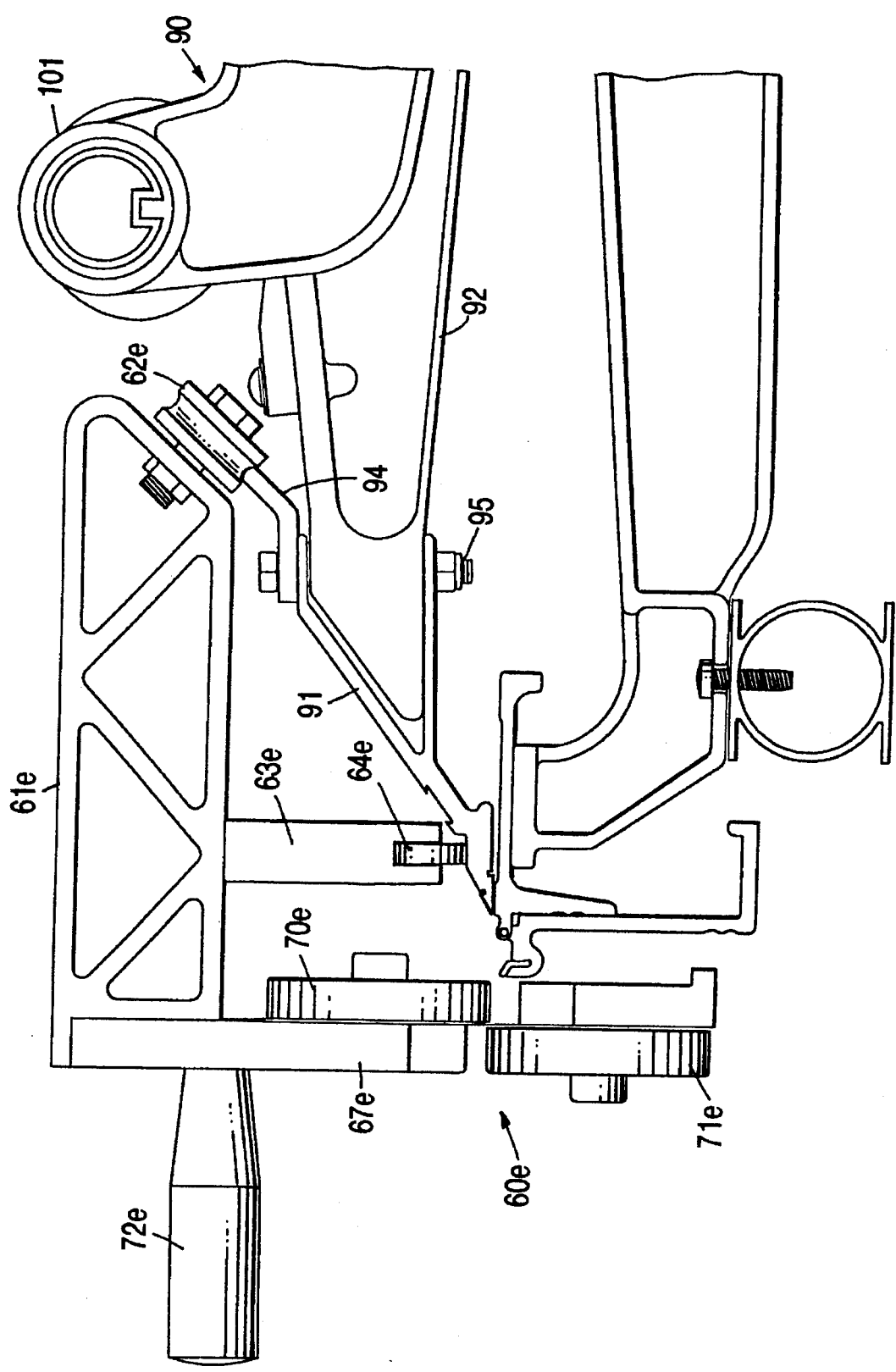
FIG. 21 is a fragmentary view on an enlarged scale of the portable sheet bending brake and removable cutter shown in FIG. 20.

The invention may be also applied to other types of portable sheet bending brakes such as shown in U.S. Pat. No. 4,566,304, incorporated herein by reference. Such portable sheet bending brakes include longitudinally spaced C-shaped members 90 that support a clamping member 91 fixed on the pivot bars 92 for movement toward and away from a clamping surface 93. As shown in FIG. 19, a track 94 is bolted at the juncture of the clamping member 91 and pivot bar 92 by a bolt 95. The removable cutter 60e is similar to that shown in FIGS. 3–11 modified such that the extruded body 61e will position the cutter properly. In this form, the handle 72e extends horizontally.

Figure 20:
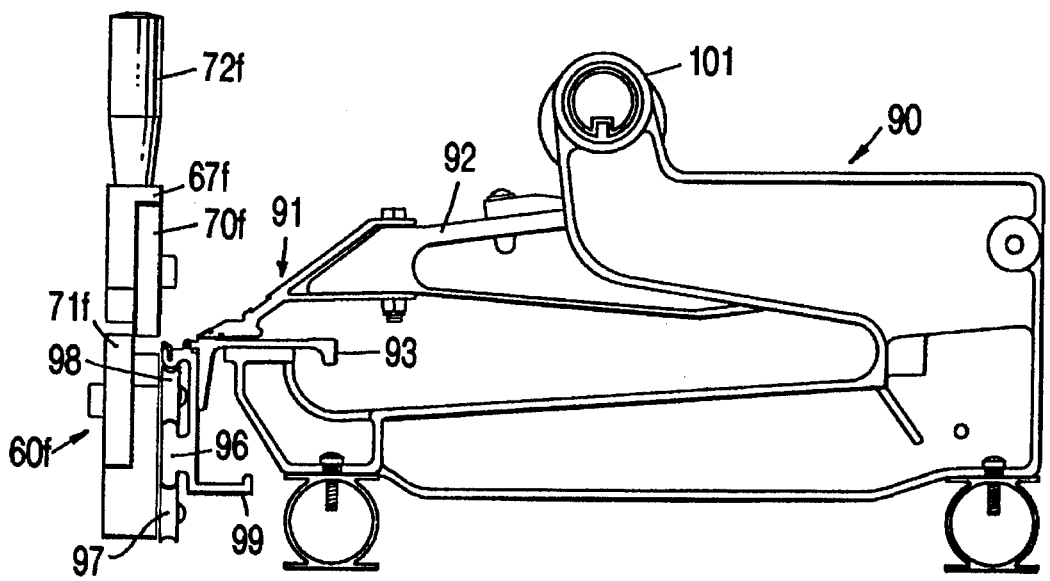
FIG. 20 is a fragmentary end view of a further modified form of portable sheet bending brake and removable cutter.

In the form shown in FIG. 20, the cutter 60f is mounted on an integral track 96 and includes upper and lower sets of rollers 97, 98 that mount the cutter on the bending member 99.

Figure 22:
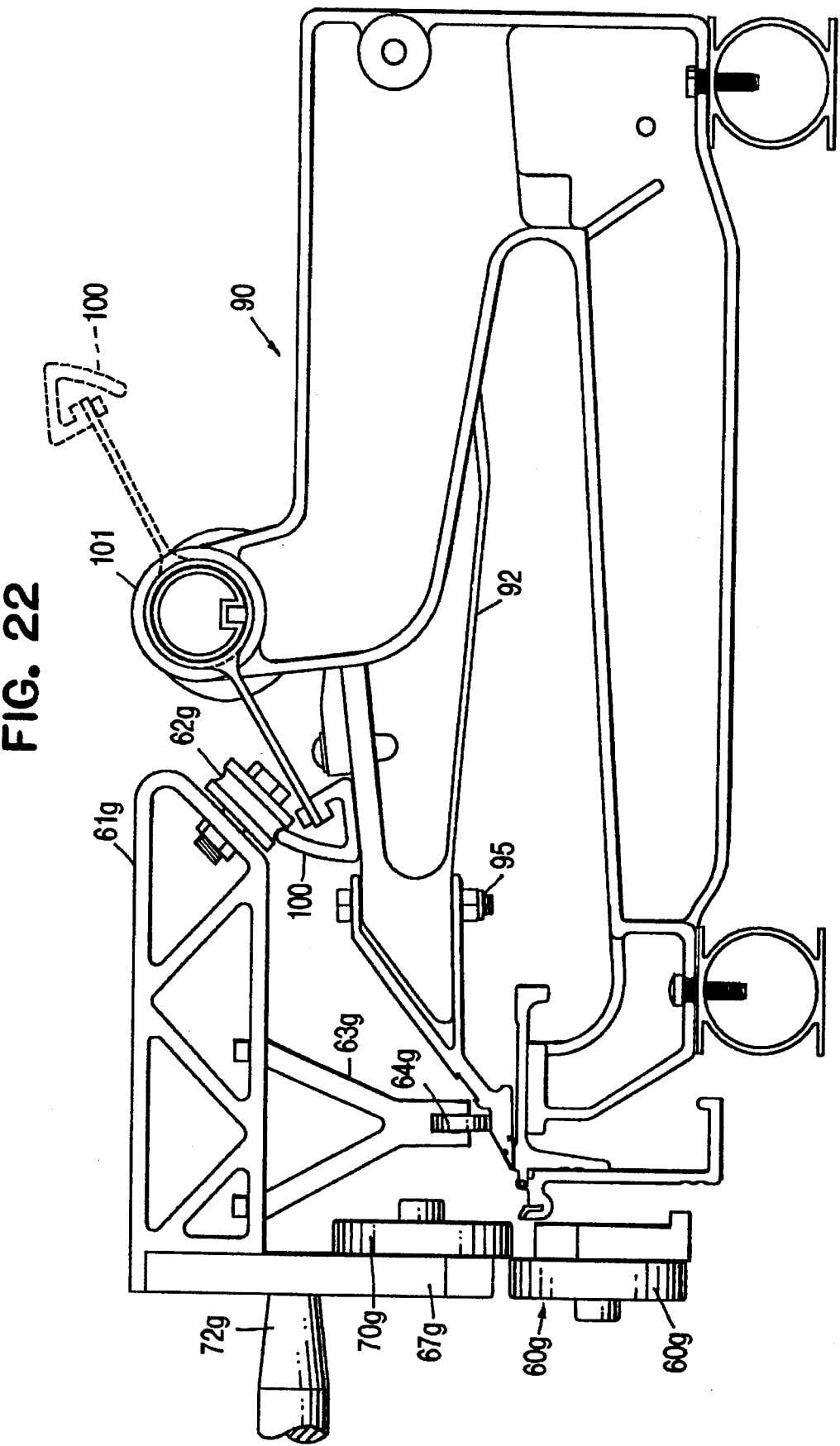
FIG. 22 is an end view of a further modified form of portable sheet bending brake and removable cutter.

In the form shown in FIG. 22, the track 100 is pivoted at opposite ends of handle 101 which moves cams that actuate the pivot bars 92. In the stored position, the track is stored out of the way as shown in broken lines. In the operating position, the track is moved into contact with the pivot bars and the removable cutter 60g is brought into position as shown. In this form, the cutter 60g is substantially the same as that in FIG. 19.

Although the invention has been described in connection with two types of portable sheet bending brakes as shown in FIGS. 1–18, it is applicable to other types which are lightweight portable bending brakes and use longitudinally spaced C-shaped frame members.

Figure 23:
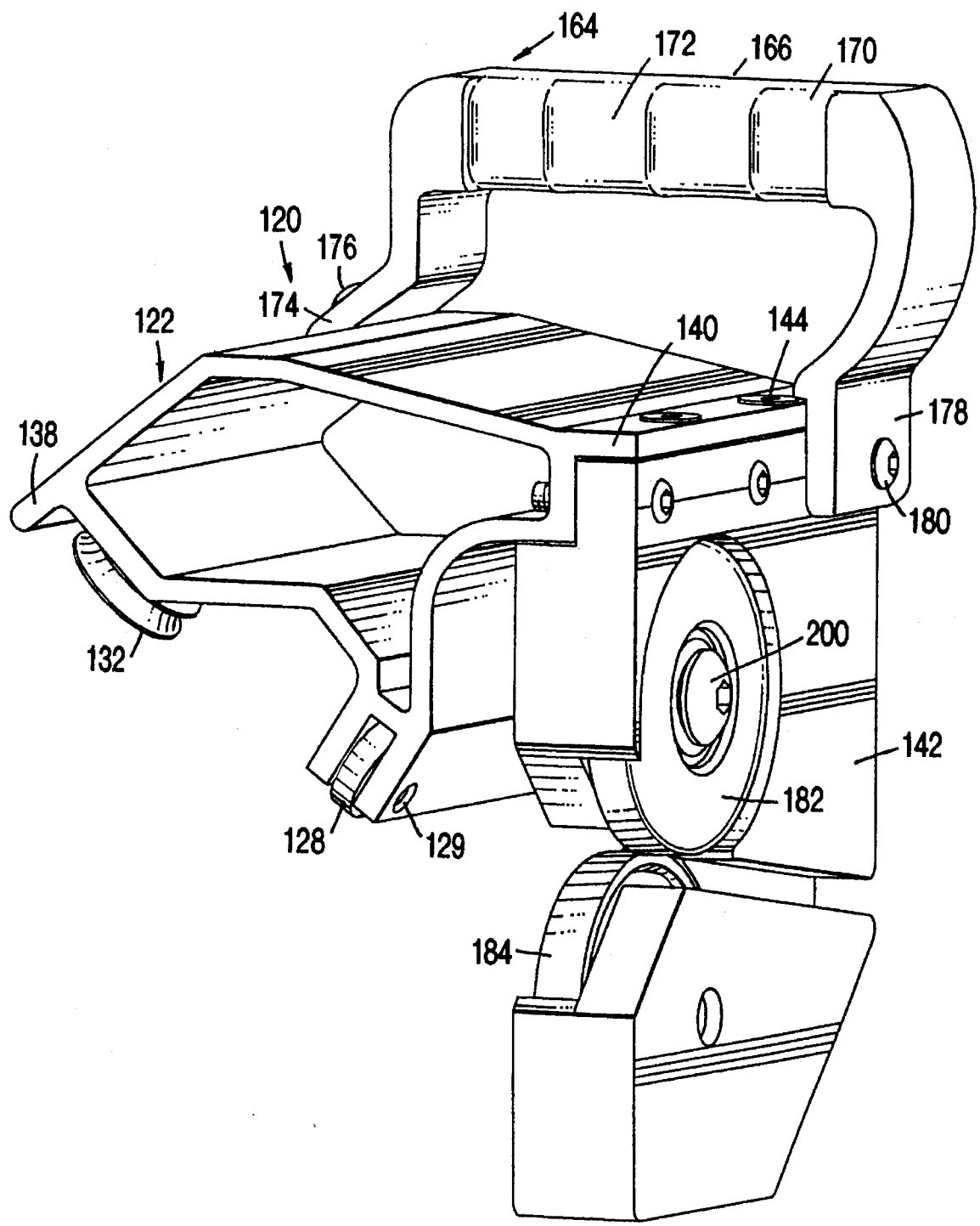
FIG. 23 is a rear perspective view of a modified form of cutter.
Figure 24:
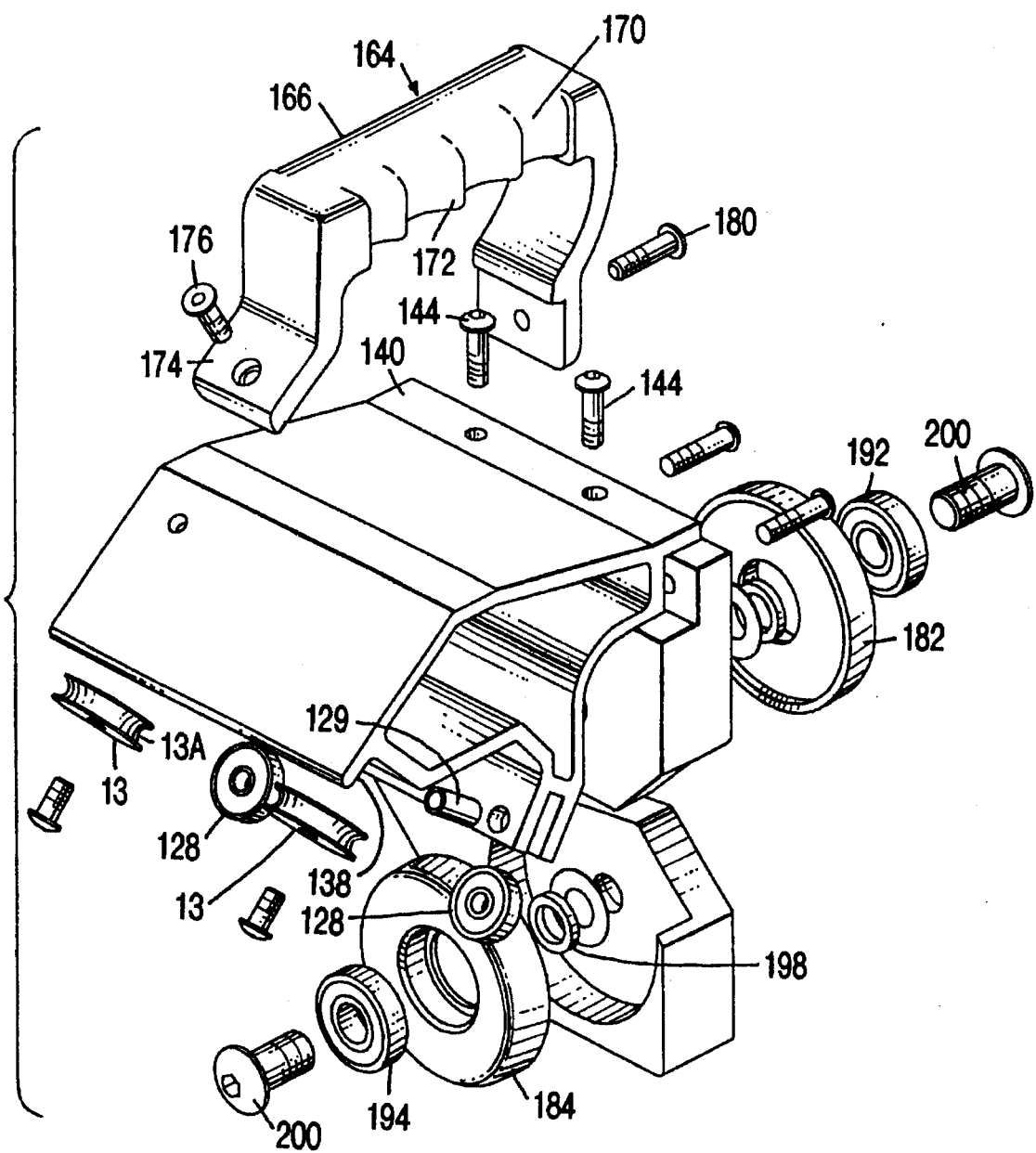
FIG. 24 is an exploded view of the cutter shown in FIG. 23.
Figure 25:
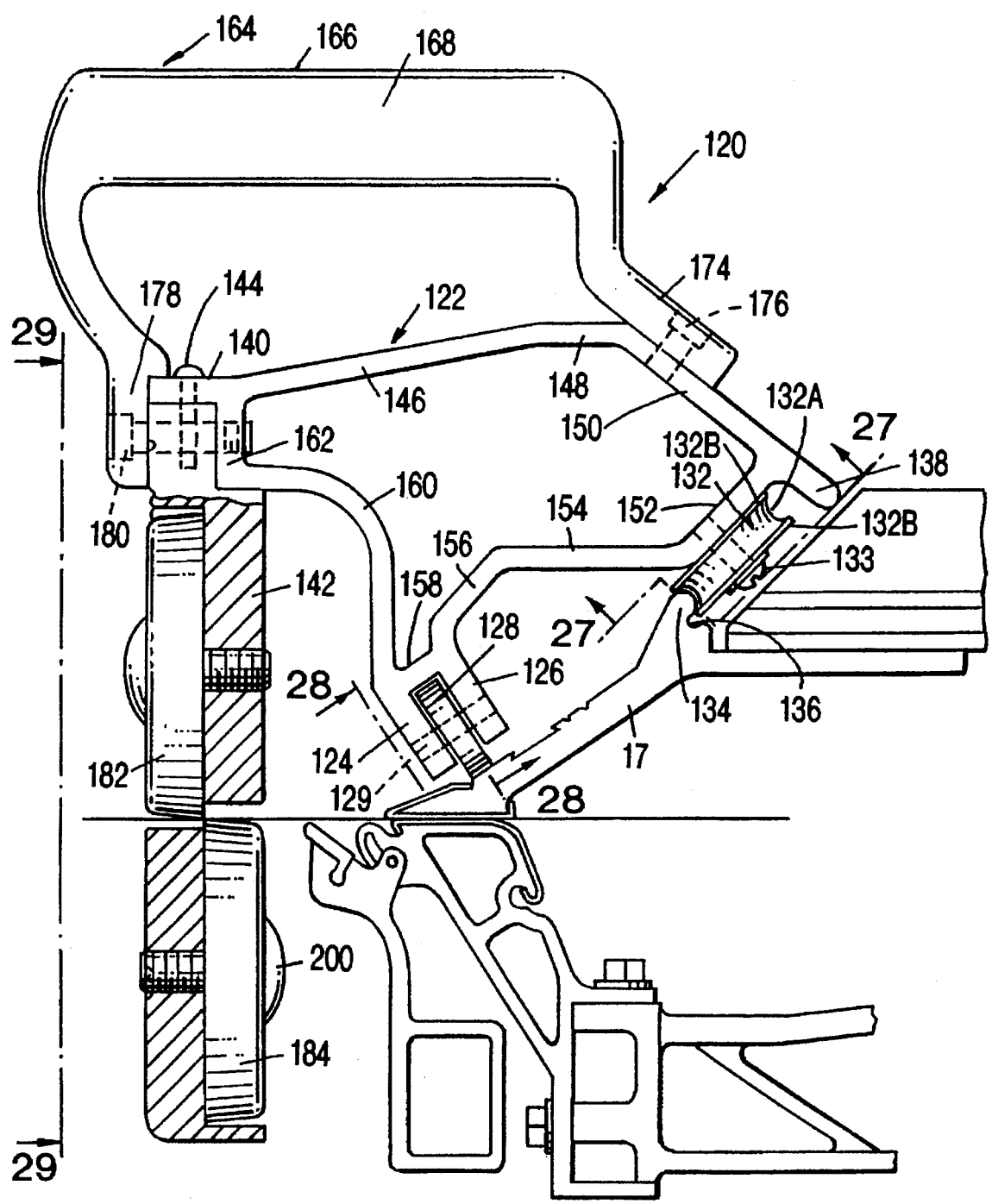
FIG. 25 is a fragmentary enlarged part section view of a portion of the portable sheet bending brake and cutter shown in FIG. 23.

In the modified form shown in FIGS. 23–35, the invention is shown in connection with the sheet bending brake shown in FIG. 1. In this form, a preferred form of hand operated cutter 120 comprises an extruded generally tubular body 122 which includes integral space walls 124, 126 that extends downwardly and inwardly (FIG. 25, 26). A pair of longitudinally spaced bearing supported rollers 128 are rotatably supported between walls 124, 126 by pins 129 pressed in place is aligned openings in walls 124, 126 (FIGS. 23, 24). Longitudinally spaced rollers 132 are rotatably mounted on tubular body 122 by belts 133. Each roller 132 includes an annular groove 132a and an annular flanges 132b which define a substantially semicircular cross section. Groove 134a engages an integral longitudinally extending track 134 on clamping member 17. The track 134 has a semicircular cross section complementary to the groove 132a and includes a deep recess 136 to receive one of the flanges 132b on rollers 132. Tubular body 122 also includes an inner integral flange 138 which overlies rollers 128 and an outer integral flange 140 which overlies the upper edge of roller cutter body 142 and is fastened thereto by screws 144 (FIG. 26).

Figure 26:
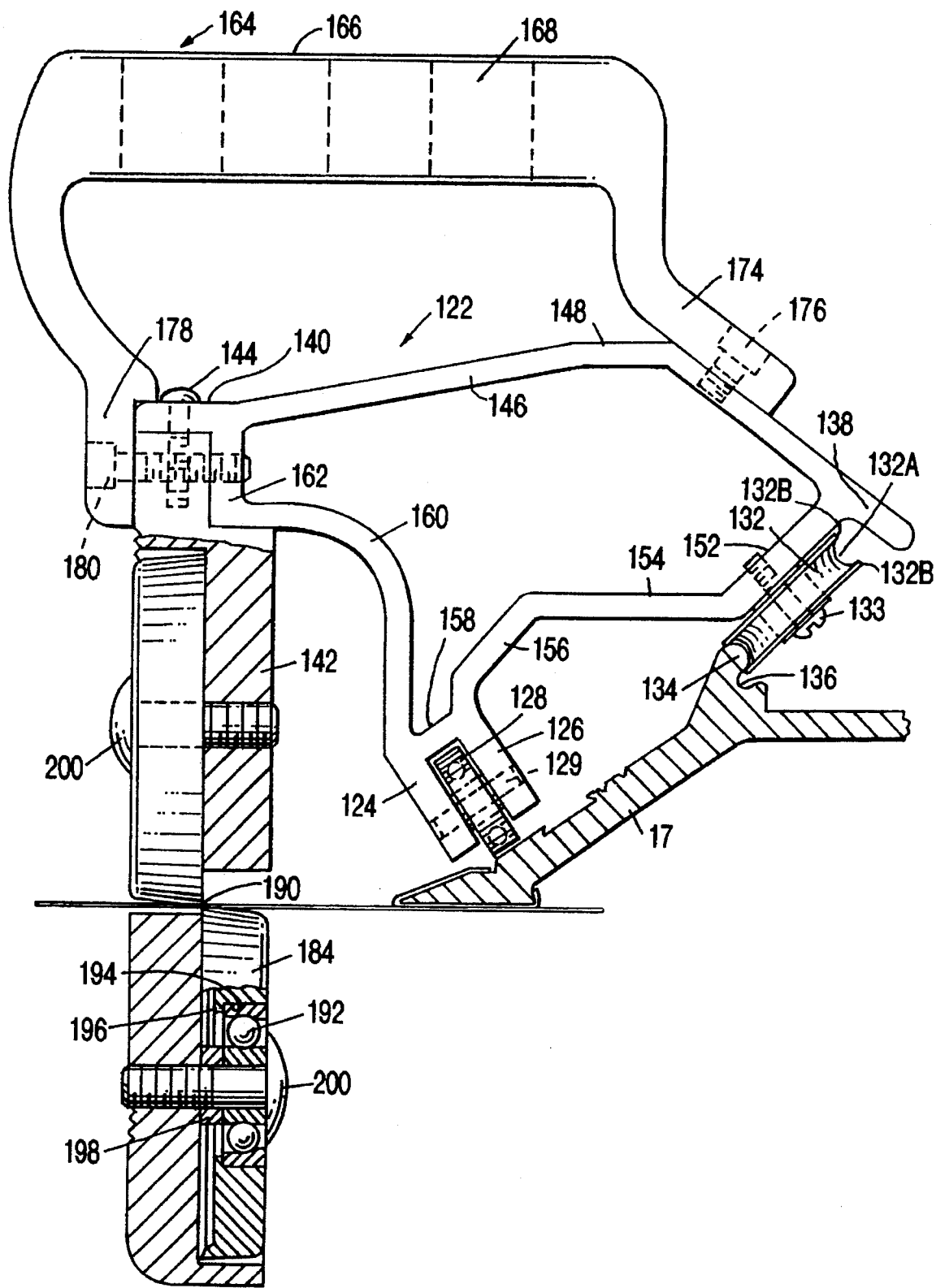
FIG. 26 is an enlarged view similar to FIG. 25, parts being broken away.
Figure 27:
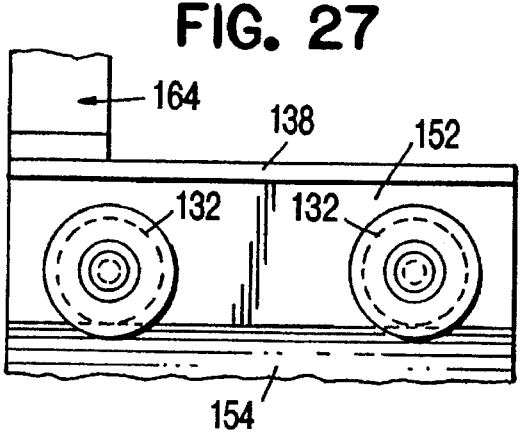
FIG. 27 is a fragmentary sectional view taken along the line 27—27 in FIG. 25.
Figure 29:
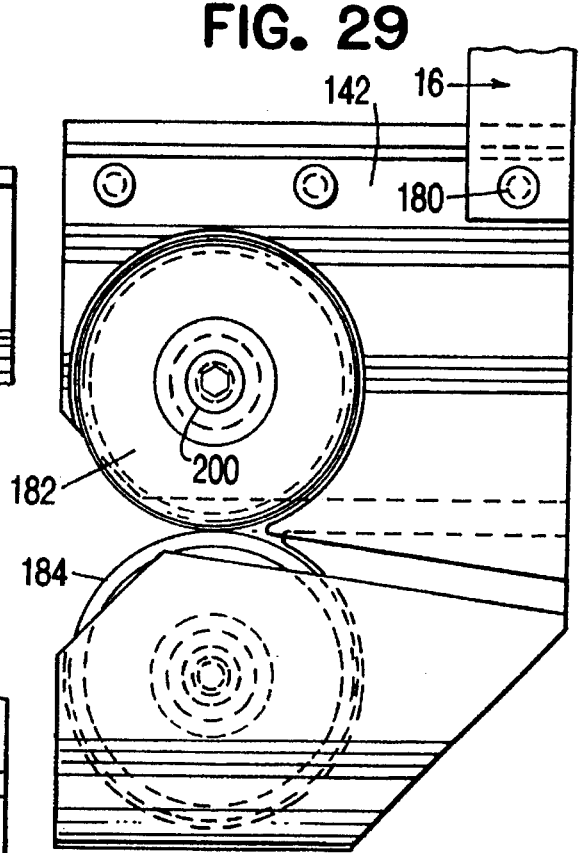
FIG. 29 is a fragmentary view taken along the line 29—29 in FIG. 25.
Figure 28:
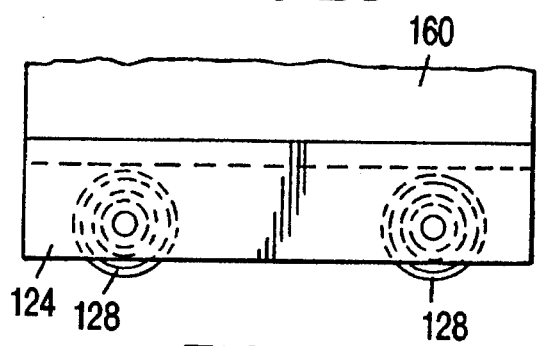
FIG. 28 is a fragmentary view taken along the line 28—28 in FIG. 25.
Figure 30:
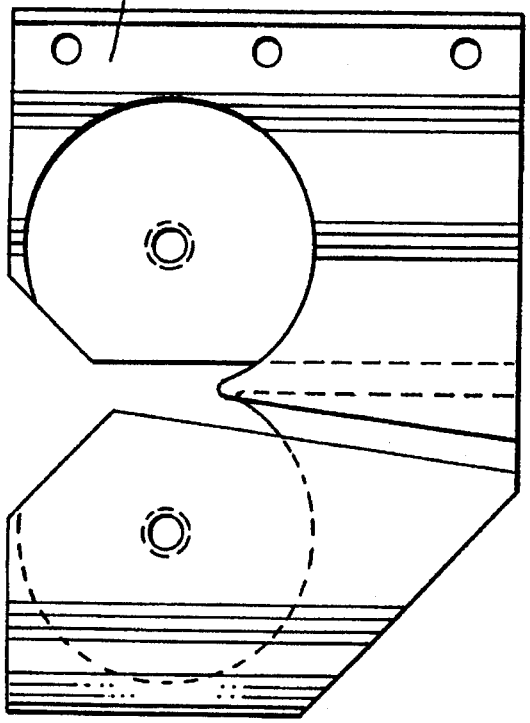
FIG. 30 is a view similar to FIG. 29 showing the cutter body with the cutting rolls removed.
Figure 31:
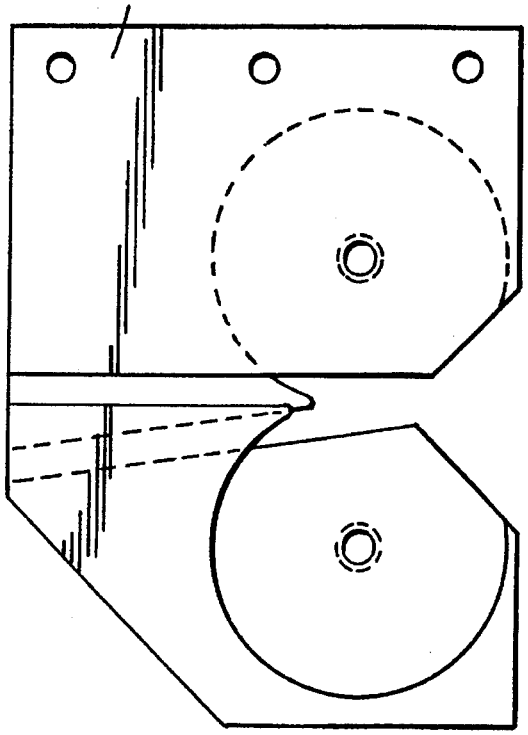
FIG. 31 is a rear view of the cutter body shown in FIG. 30.

The cross section of tubular body 122 preferably includes a top wall having a first portion 146 extending from outer flange 140 upwardly and inwardly, a short second horizontal portion 148 extending from portion 146, a third portion 150 extending from second portion 148 downwardly and inwardly to inner flange 138 (FIG. 26). The body 122 includes a lower flange 152 that extends downwardly and inwardly from inner flange 138 to a horizontal portion 154 which inturn extends to a downwardly and outwardly extending portion 156 to a wall 158 from which flanges 138, 140 extends. An outer inwardly concave portion 160 extends from wall 158 to a short vertical wall 162 that is connected to the juncture of portion 146 and outer flange 140.

A one piece handle 164 is provided and includes a horizontal portion 166 having one smooth side surface 168 and an opposite surface 170 with vertical finger receiving recesses 172 (FIGS. 23, 24). The handle 164 further includes an inner downwardly and inwardly extending flange 174 that is connected to third portion 150 of body 122 by bolt 176. Handle 164 includes an outer flange 178 which extends along cutter body 142 and is connected thereto by a bolt 180 extending through body 142 and threaded into vertical wall 162.

The cutter includes an upper and outer cutting roller 182 and a cooperating inner and lower cutting roller 184 provided in machined recesses 186, 188, respectively in cutter body 142. Each of the cutting rollers 182, 184 is identical in construction and is rotatably mounted in body 142 in the same manner. Referring to FIGS. 26, 32–35 each roller 182, 184 has cooperating cutting edges 190 which are tapered inwardly. A roller bearing 192 extends into a cylindrical recess 194 in its respective roller and its outer race engages an inwardly extending integral flange 196 on the roller. A spacer 198 is interposed between the cutter body 142 and roller and abuts the inner race of bearing 192. A bolt 200 extends through the center of bearing 192 and roller and is threaded into body 142.

Figure 36:
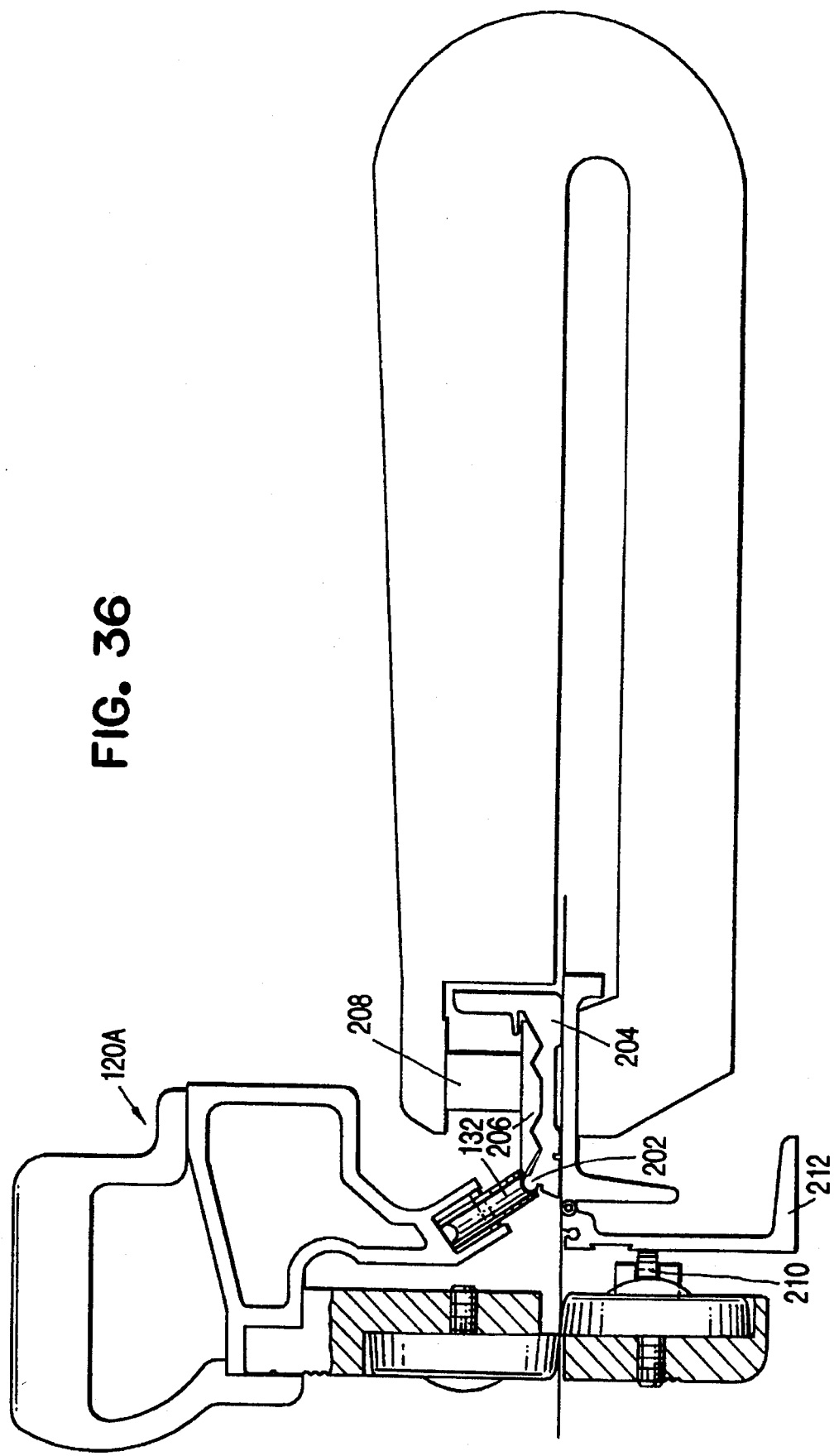
FIG. 36 is a part sectional view of another form of combined sheet bending brake and cutter.

In the modified form shown in FIG. 36, the cutter of the type shown in the prior form described with reference to FIGS. 23–35 and is shown as mounted on a sheet bending brake such as shown in U.S. Pat. No. 3,161,223, incorporated herein by reference. In this form, the cutter 120a only includes rollers 132 which engage an integral track 202 on the anvil 204 of the brake which is clamped in position by a longitudinally extending plate 206 with cams 208, as shown in U.S. Pat. No. 3,161,223. A second roller 210 rotatably mounted on the cutter body for rotation about a vertical axis and engages the bending member 212.

It can thus be seen that there has been provided a portable bending brake and hand operated cutter system that is removably mounted on a portable sheet bending brake; which will accurately cut the workpiece; which requires a minimal modification of the portable sheet bending brake; which can be readily added to an existing portable sheet bending brake; which wall provide accurate, smooth and flat edges on the workpiece; which cuts the workpiece quickly and is therefore time saving; and which does not damage the aluminum parts of the portable sheet bending brake; and which is low in cost.

What is claimed is:

1. A portable sheet bending brake comprising a base, a plurality of C-shaped members positioned on said base at longitudinally spaced points, each said C-shaped member comprising a lower arm fixed to said base and an upper arm spaced from and overlying said lower arm, a first member fixed to the lower arms of said C-shaped members and having a longitudinally extending clamping surface, a second member for bending a workpiece hinged to said first member and extending longitudinally with respect to said first member, each of said first and second members having substantially the entire length of the longitudinal edges thereof formed with longitudinally spaced intermeshing integral projections, a hinge pin extending through said openings of said second member and said slots of said first member, a longitudinally extending clamping member mounted on the upper arms of said C-shaped members, a handle member on said brake for moving said clamping member, means providing a track extending longitudinally on said portable sheet bending brake, and a cutter removably mounted on said track and movable longitudinally of said track, said cutter comprising opposed cutting rolls adjacent the clamping surface when the cutter is on the track such that the cutter may be moved along said track to cut a workpiece.

2. The portable sheet bending brake set forth in claim 1 wherein said cutter is manually movable along said track.

3. The portable sheet bending brake set forth in claim 2 wherein said means providing a track is mounted on the upper arms of the C-shaped members.

4. The portable sheet bending brake set forth in claim 3 wherein said means providing a track comprises an integral track on said clamping member.

5. The portable sheet bending brake set forth in claim 3 wherein said means providing a track comprises a separate track mounted on said clamping member.

6. The portable sheet bending brake set forth in claim 5 wherein said track is mounted at the juncture of the clamping member and pivot arms supporting said clamping member and pivoted to said C-shaped member.

7. The portable sheet bending brake set forth in claim 6 wherein said track is supported on said clamping member and pivot arms by the same bolts as support the clamping member on said pivot arms.

8. The portable sheet bending brake set forth in claim 7 wherein said track includes spaced mounting arms through which said bolts extend.

9. The portable sheet bending brake set forth in claim 8 wherein said track comprises a plurality of track sections in abutting relationship.

10. The portable sheet bending brake set forth in claim 2 wherein said means providing a track comprises a track on said second member.

11. The portable sheet bending brake set forth in claim 2 wherein said means providing a track comprises a track member pivotally mounted on the end most C-shaped members.

12. The portable sheet bending brake set forth in claim 2 wherein said means providing a track comprises a track on said handle member.

13. The portable sheet bending brake set forth in claim 3 wherein said handle member comprises a handle member that is rotatably mounted on said C-shaped members and said track being mounted at the juncture of said clamping member and pivot arms supporting said clamping member and pivoted to said C-shaped member.

14. The portable sheet bending brake set forth in claim 13 wherein said track is supported on said clamping member and pivot arms by the same bolts as support the clamping member on said pivot arms.

15. The portable sheet bending brake set forth in claim 14 wherein said track includes spaced mounting arms through which said bolts extend.

16. The portable sheet bending brake set forth in claim 15 wherein said track comprises a plurality of track sections in abutting relationship.

17. The portable sheet bending brake set forth in claim 2 wherein said handle member is rotatably mounted on said C-shaped members, and said track is hinged for movement about the axis of rotation of said handle member for movement into and out of operable position on said pivot arms.

18. The portable sheet bending brake set forth in any one of claims 1–17 wherein said cutter comprises a cutter body supporting said cutting rolls, an extruded hollow body supporting said cutter body and anti-friction means on the hollow body engaging said track and a handle extending from said extruded body.

19. The portable sheet bending brake set forth in claim 18 wherein said hollow body supports said cutting rolls in a cantilever fashion.

20. The portable sheet bending brake set forth in claim 18 wherein said extruded hollow body supports anti-friction means engaging and movable along a longitudinally extending portion of said clamping member when the cutter is mounted on said track.

21. The portable sheet bending brake set forth in claim 20 wherein said cutter comprises a tubular body having integral spaced flanges, said anti friction means comprising at least one roller rotatably mounted between said flanges.

22. The portable sheet bending brake set forth in claim 21 wherein said tubular body includes at least one roller rotatably mounted on said tubular body and engaging said track.

23. The portable sheet bending member set forth in claim 22 wherein said tubular body includes an integral flange overlying said roller engaging said track.

24. The portable sheet bending member set forth in claim 23 wherein said tubular body includes an integral flange overlying said cutter body.

25. The portable sheet bending brake set forth in claim 24 including a U-shaped handle attached to said cutter body and tubular body.

26. The portable sheet bending brake set forth in claim 25 wherein said handle member includes a gripping portion with a smooth surface and an opposite surface having finger receiving grooves therein.

27. The portable sheet bending brake set forth in claim 26 wherein each said cutting roller comprises an axial opening therethrough and an annular cutting edge, means for rotatably mounting said cutting roller on said cutter body comprising a roller bearing having an outer race and an inner race, said outer race engaging said opening on said cutting roll, means limiting the axial movement of said bearing toward the cutting edge of said cutting roll, spacer means interposed between the inner race and said cutter body, and means extending through said inner race and said spacer means for mounting said cutting roll on said cutter body.

28. The portable sheet bending brake set forth in claim 18 wherein said cutter comprises a tubular body having integral spaced flanges, said anti friction means comprising at least one roller rotatably mounted between said flanges.

29. The portable sheet bending brake set forth in claim 28 wherein said tubular body includes at least one roller rotatably mounted on said tubular body and engaging said track.

30. The portable sheet bending member set forth in claim 29 wherein said tubular body includes an integral flange overlying said roller engaging said track.

31. The portable sheet bending member set forth in claim 30 wherein said tubular body includes an integral flange overlying said cutter body.

32. The portable sheet bending brake set forth in claim 31 including a U-shaped handle attached to said cutter body and tubular body.

33. The portable sheet bending brake set forth in claim 32 wherein said handle member includes a gripping portion with a smooth surface and an opposite surface having finger receiving grooves therein.

34. The portable sheet bending brake set forth in claim 33 wherein each said cutting roller comprises an axial opening therethrough and an annular cutting edge, means for rotatably mounting said cutting roller on said cutter body comprising a roller bearing having an outer race and an inner race, said outer race engaging said opening on said cutting roll, means limiting the axial movement of said bearing toward the cutting edge of said cutting roll, spacer means interposed between the inner race and said cutter body, and means extending through said inner race and said spacer means for mounting said cutting roll on said cutter body.

35. The method of making a portable sheet bending brake comprising providing a base, providing a plurality of C-shaped members positioned on said base at longitudinally spaced points, each said C-shaped member comprising a lower arm fixed to said base and an upper arm spaced from and overlying said lower arm, providing a first member fixed to the lower arms of said C-shaped members and having a longitudinally extending clamping surface, providing a second member for bending a workpiece hinged to said first member and extending longitudinally with respect to said first member, each of said first and second members having substantially the entire length of the longitudinal edges thereof formed with longitudinally spaced intermeshing integral projections, providing a hinge pin extending through said openings of said second member and said slots of said first member, providing a longitudinally extending clamping member mounted on the upper arm of said C-shaped members, providing a handle member on said brake for moving said clamping member, providing a track extending longitudinally on said portable sheet bending brake, providing a cutter removably mounted on said track and movable longitudinally of said track, said cutter comprising opposed cutting rolls adjacent the clamping surface when the cutter is on the track such that the cutter may be moved along said track to cut a workpiece.

36. The method set forth in claim 35 wherein said steps of providing a track comprises mounting said track on the upper arms of the C-shaped members.

37. The method set forth in claim 35 wherein said step of providing a track comprises providing an integral track on said clamping member.

38. The method set forth in claim 35 wherein said step of providing a track comprises providing a separate track mounted on said clamping member.

39. The method set forth in claim 35 wherein said step of pivoting said clamping member comprises providing pivot arms pivoted to said sheet bending members and attaching said clamping member to said arms, and said step of providing a track comprises positioning said track at the juncture of said clamping member and pivot arms.

40. The method set forth in claim 35 wherein said step of providing a track comprises placing a track on said bending member.

41. The method set forth in claim 35 wherein said step of providing a track comprises pivotally mounting a track on said C-shaped member.

42. The method set forth in claim 35 wherein said step of providing a track comprises mounting a track on said handle member.

43. The method set forth in claim 35 wherein said step of providing a handle member comprises rotatably mounting a handle on said C-shaped members and said step of providing a track comprises rotatably mounting said track for movement about the axis of the handle member into and out of operative position.

44. The method set forth in any one of claims 35–43 wherein said step of providing a cutter comprises forming a roll assembly, mounting said roll assembly on an extruded hollow body and providing anti-friction means on said body for engaging a track.

45. The method set forth in claim 44 including the step of providing said body supporting said cutting rolls in a cantilever fashion.

46. The method set forth in claim 44 including the step of providing an anti-friction member on said hollow body engaging and movable along a longitudinally extending portion of said portable sheet bending brake when the cutter is mounted on said track.

47. The method set forth in claim 46 wherein said step of providing said cutter comprises forming a tubular body having integral spaced flanges and move by said anti friction means comprising at least one roller rotatably mounted between said flanges.

48. The method set forth in claim 47 including wherein said providing tubular body at least one roller rotatably mounted on said tubular body and engaging said track.

49. The method set forth in claim 48 including an integral flange on said tubular body overlying said roller engaging said track.

50. The method set forth in claim 49 wherein said tubular body includes an integral flanges on said tubular body overlying said cutter body.

51. The method set forth in claim 50 including providing a V-shaped handle onto said cutter body and tubular body.

52. The method set forth in claim 51 including providing said handle member with a gripping portion with a smooth surface and an opposite surface having finger receiving grooves therein.

53. The method set forth in claim 52 including providing each said cutting roller with an axial opening therethrough and an annular cutting edge, and rotatably mounting said cutting roller on said cutter body by using a roller bearing having an outer race and an inner race, said outer race engaging said opening on said cutting roll, limiting the axial movement of said bearing toward the cutting edge of said cutting roll, and providing spacer means interposed between the inner race and said cutter body, and providing means extending through said inner race and said spacer means for mounting said cutting roll on said cutter body.

54. The method set forth in claim 35 wherein said step of providing said cutter comprises forming a tubular body having integral spaced flanges and move by said anti friction means comprising at least one roller rotatably mounted between said flanges.

55. The method set forth in claim 54 including wherein said providing tubular body at least one roller rotatably mounted on said tubular body and engaging said track.

56. The method set forth in claim 55 including an integral flange on said tubular body overlying said roller engaging said track.

57. The method set forth in claim 56 wherein said tubular body includes an integral flanges on said tubular body overlying said cutter body.

58. The method set forth in claim 57 including providing a V-shaped handle onto said cutter body and tubular body.

59. The method set forth in claim 58 including providing said handle member with a gripping portion with a smooth surface and an opposite surface having finger receiving grooves therein.

60. The method set forth in claim 59 including providing each said cutting roller with an axial opening therethrough and an annular cutting edge, and rotatably mounting said cutting roller on said cutter body by using a roller bearing having an outer race and an inner race, said outer race engaging said opening on said cutting roll, limiting the axial movement of said bearing toward the cutting edge of said cutting roll, and providing spacer means interposed between the inner race and said cutter body, and providing means extending through said inner race and said spacer means for mounting said cutting roll on said cutter body.

61. A portable sheet bending brake comprising a base, a plurality of C-shaped members positioned on said base at longitudinally spaced points, each said C-shaped member comprising a lower arm fixed to said base and an upper arm spaced from and overlying said lower arm, a first member fixed to the lower arms of said C-shaped members and having a longitudinally extending clamping surface, a second member for bending a workpiece, said second member being hinged to said first member and extending longitudinally with respect to said first member, a longitudinally extending clamping member mounted on the upper arms of said C-shaped members, a handle member on said brake for moving said clamping member against said clamping surface on said first member for clamping a workpiece against said clamping surface between said clamping member and said first member, means providing a track extending longitudinally on said portable sheet bending brake, and a cutter mounted on said track and movable longitudinally of said track, said cutter comprising means for engaging said track to guide longitudinal motion of said cutter, and opposed cutting rolls adjacent to the clamping surface when the cutter is on the track so as to cut a workpiece clamped against said clamping surface as the cutter is moved along said track.

62. The portable sheet bending brake set forth in claim 61 wherein said cutter is manually movable along said track.

63. The portable sheet bending brake set forth in claim 61 wherein said means providing a track is mounted on the upper arms of the C-shaped members.

64. The portable sheet bending brake set forth in claim 63 wherein said means providing a track comprises an integral track on said clamping member.

65. The portable sheet bending brake set forth in claim 63 wherein said means providing a track comprises a separate track mounted on said clamping member.

66. The portable sheet bending brake set forth in claim 61 wherein said means providing a track comprises a track on said second member.

67. The portable sheet bending brake set forth in claim 61 wherein said means providing a track comprises a track member pivotally mounted on the end-most C-shaped members.

68. The portable sheet ending brake set forth in claim 61 wherein said means providing a track comprises a track on said handle member.

69. The portable sheet bending brake set forth in claim 61 wherein said handle member is rotatably mounted on said C-shaped members, and said track is mounted at the juncture of said clamping member and pivot arms supporting said clamping member and pivoted to said C-shaped member.

70. The portable sheet bending brake set forth in claim 61 wherein said handle member is rotatably mounted on said C-shaped members and said track is hinged for movement about the axis of rotation of said handle member for movement into and out of operable position on said pivot arms.

71. The portable sheet bending brake set forth in claim 61 wherein said cutter comprises a cutter body supporting said cutting rolls, an extruded hollow body supporting said cutter body and anti-friction means on the hollow body engaging said track and a handle extending from said extruded body.

72. The portable sheet bending brake set forth in claim 61 wherein said cutter comprises a tubular body having integral spaced flanges and at least one roller rotatably mounted between said flanges for engaging said track.

* * * * *

Disclaimer 5,582,053—Arthur B. Chubb, Romulus; Douglas J. Chubb; Norman L. Chubb, both of Carleton, all of Mich. COMBINED PORTABLE SHEET BENDING BRAKE AND CUTTER. Patent dated December 10, 1996. Disclaimer filed November 6, 2001, by the assignee, Tapco International Corporation.

Hereby enters this disclaimer to claims 61, 62, 63, 64 and 71 of said patent.
*(Official Gazette May 21, 2002)*